(12) United States Patent
Imai et al.

(10) Patent No.: US 7,730,815 B2
(45) Date of Patent: Jun. 8, 2010

(54) VIBRATION BODY FOR CUTTING, PROCESSING DEVICE, MOLDING DIE AND OPTICAL ELEMENT

(75) Inventors: Toshiyuki Imai, Hachioji (JP); Shigeru Hosoe, Hachioji (JP); Hiroyuki Matsuda, Sagamihara (JP); Isao Takano, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 783 days.

(21) Appl. No.: 11/702,171

(22) Filed: Feb. 5, 2007

(65) Prior Publication Data
US 2007/0180961 A1    Aug. 9, 2007

(30) Foreign Application Priority Data
Feb. 8, 2006 (JP) .............................. 2006-031328

(51) Int. Cl.
*B23B 7/00* (2006.01)
*B23B 29/02* (2006.01)

(52) U.S. Cl. .......................... 82/118; 82/904

(58) Field of Classification Search ................... 82/118, 82/1.11, 76, 904, 133; 409/141, 143, 11, 409/17
See application file for complete search history.

(56) References Cited

U.S. PATENT DOCUMENTS

| | | | | |
|---|---|---|---|---|
| 2,475,784 A | * | 7/1949 | Grove | 407/97 |
| 2,553,251 A | * | 5/1951 | Gutterman | 310/30 |
| 3,447,402 A | * | 6/1969 | Ray | 408/143 |
| 3,472,103 A | * | 10/1969 | Fayolle et al. | 82/173 |
| 3,820,422 A | * | 6/1974 | Riven et al. | 82/158 |
| 5,899,252 A | * | 5/1999 | Pozzo | 144/371 |

* cited by examiner

*Primary Examiner*—Will Fridie, Jr.
(74) *Attorney, Agent, or Firm*—Finnegan, Henderson, Farabow, Garrett & Dunner, L.L.P.

(57) ABSTRACT

In the assembly of vibration body, the first width in the lateral direction (X axis direction) is greater than the second width in the longitudinal direction (Y axis direction) in the cross sectional form perpendicular to Z axis of the first portion on the tip side from the closest node position, thereby, the rigidity of a vibration body main part in the X axis direction can be enhanced, and lateral bending vibrations on fixing portion can be restrained.

Consequently, an object can be processed highly accurately by the assembly of vibration body that is controlled with a high precision.

15 Claims, 18 Drawing Sheets

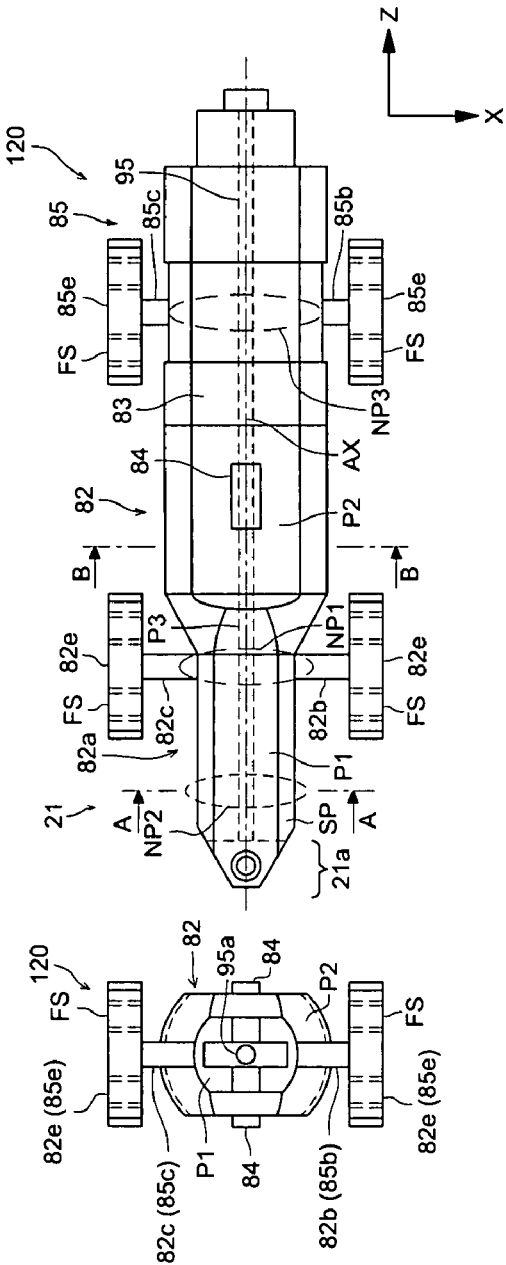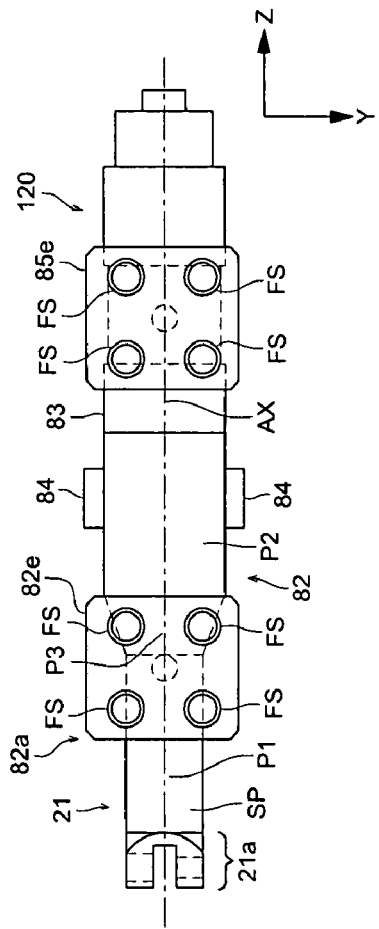
FIG. 2(a) FIG. 2(b) FIG. 2(c)

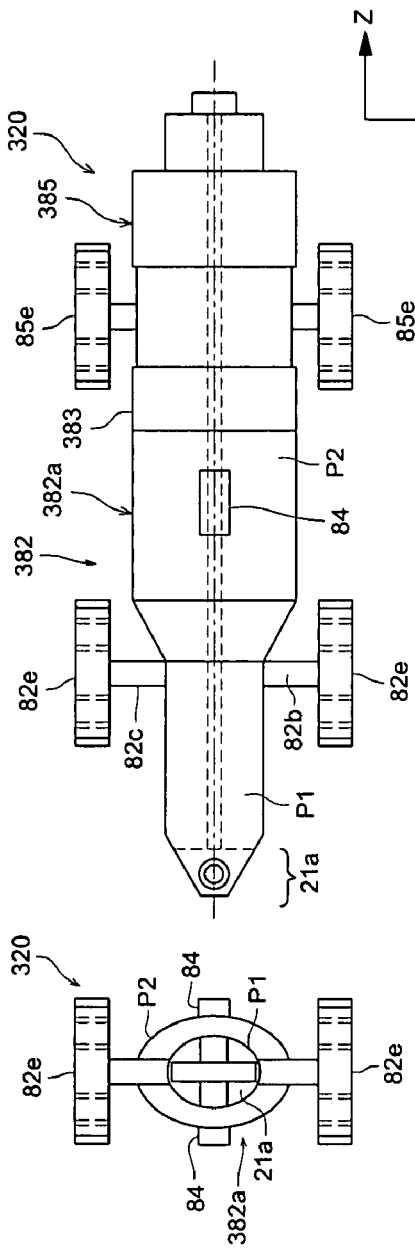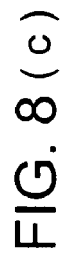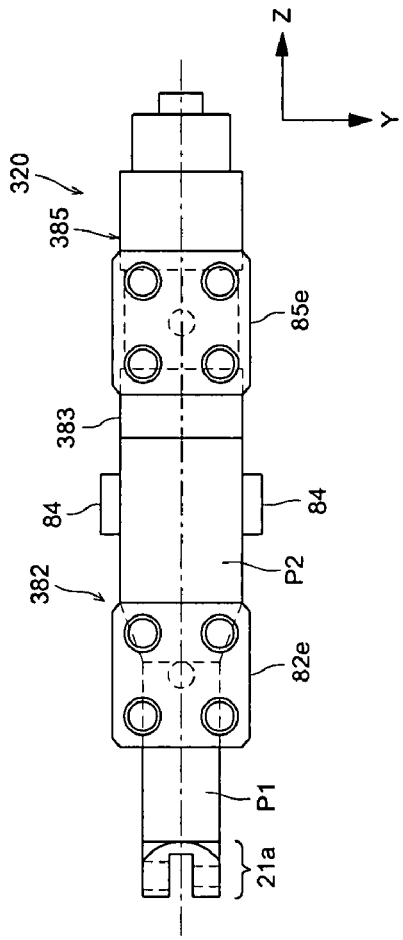

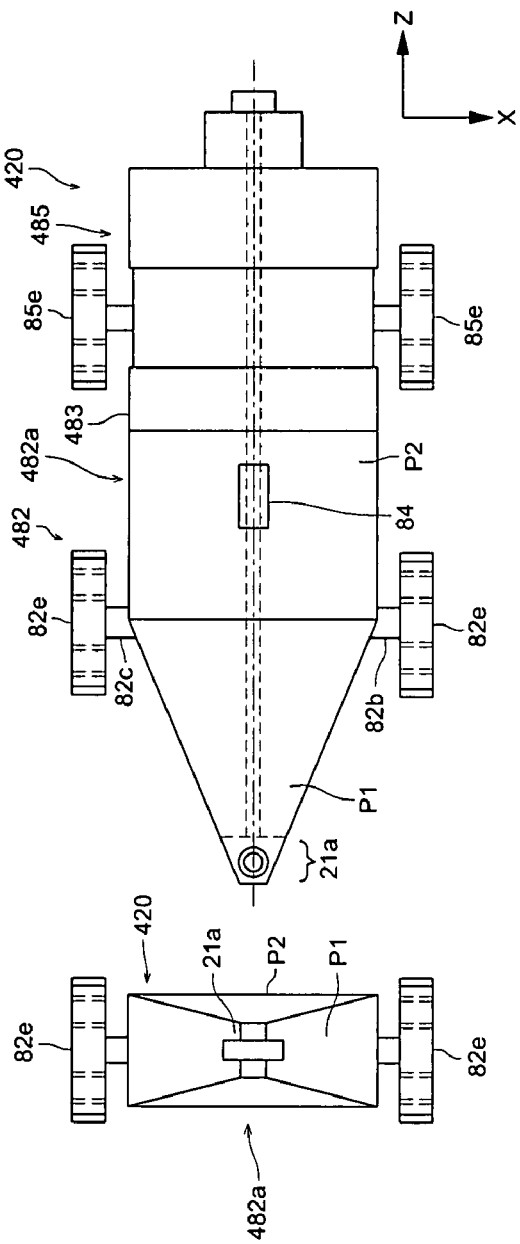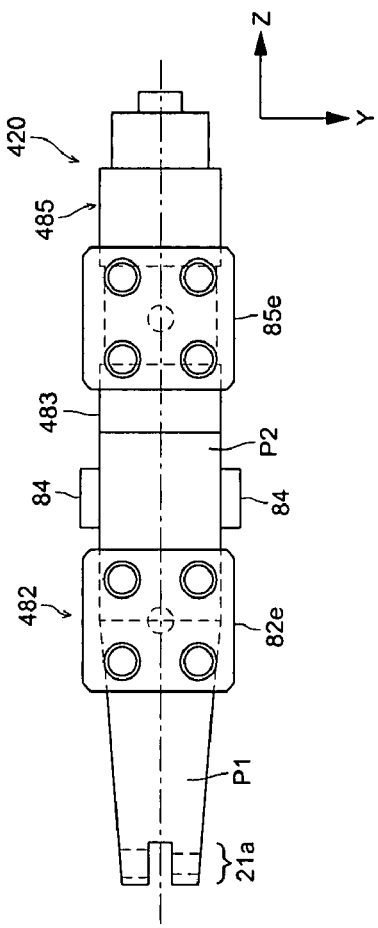

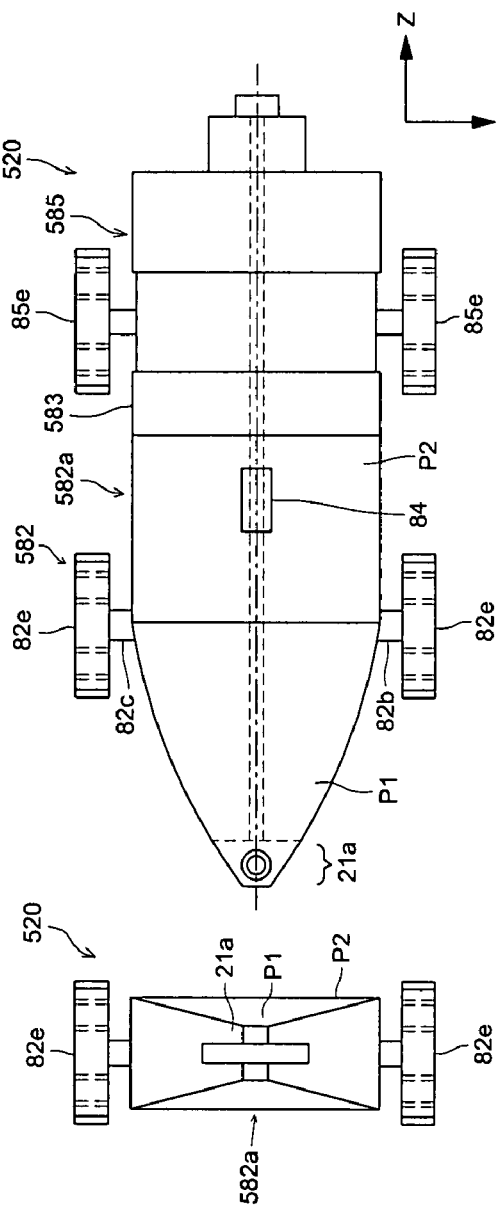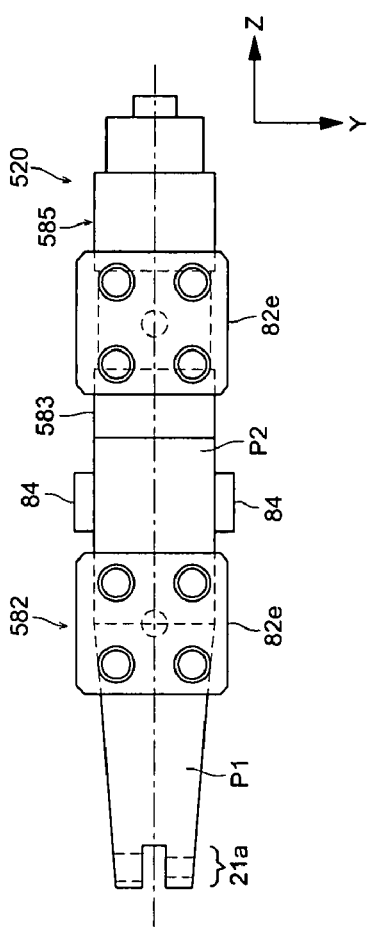

VIBRATION BODY FOR CUTTING, PROCESSING DEVICE, MOLDING DIE AND OPTICAL ELEMENT

This application is based on Japanese Patent Application No. 2006-031328 filed on Feb. 8, 2006 in Japanese Patent Office, the entire content of which is hereby incorporated by reference.

BACKGROUND OF THE INVENTION

The present invention relates to a vibration body for cutting and a processing device used favorably in the case of forming a molding die for an optical element and others, and a molding die and an optical element produced by using the aforesaid items.

There is available a technology to cut materials such as carbide and glass which are hard-to-cut materials by vibrating a tip of a cutting tool such as a diamond tool, which is called vibration cutting. In this technology, minute cutting-in is conducted at high speed by a cutting edge of a cutting tool through vibration, and chips generated in this time are scraped out by the cutting edge through vibration, resulting in realization of cutting processes which cause less stress for a cutting tool and a material to be cut (for example, see Patent Documents 1, 2, 3 and 4). Owing to this process of vibration cutting, a critical depth of cut needed for an ordinary cutting of ductile mode is improved to be several times as large as its normal depth, thus, the hard-to-cut materials can be subjected to cutting process at high efficiency.

In such process of vibration cutting of this kind, high speed vibration of 20 kHz or more is usually used, because for improving the efficiency of processing, when a vibration frequency is enhanced, the aforesaid effects are increased and a feed rate for the tool is also enhanced in proportion substantially to the frequency. There is also an advantage that an oscillator or a vibration body excited by the oscillator does not cause an offensive noise, because the aforesaid frequency is beyond a human audible range.

As a method to generate high speed vibration on a cutting edge of a cutting tool, a method has been put to practical use wherein a holding member that holds a tool is excited with a piezoelectric element or a super-magnetostrictor, to vibrate stably as a standing wave, by resonating this holding member with bending vibration and axial vibration (axial direction vibration). In this method, the vibration body that holds the cutting tool usually has a columnar outer form having a circular cross section, and its tip portion is tapered off.

However, in the case of using the columnar vibration body such as one mentioned above, when processing an optical surface having a large facing angle, a form error on the surface processed arrives at several microns, and improvement of processing accuracy is not easy, though an optical surface having a small facing angle can be processed relatively accurately. Incidentally, a facing angle means an angle of inclination of a normal line on the optical surface relative to an axis of the vibration body or to the optical axis.

The reason why an improvement of processing accuracy is not easy is considered that control of the state of vibration concerning to bending vibration is not easy because of a circular cross section of the vibration body, and great bending vibration is also generated in the direction perpendicular to the direction of aimed bending vibration. Further, it is also considered that bending rigidity in the direction perpendicular to the direction of aimed bending vibration, because of a circular cross section of the vibration body, and when the reactive force resulting from cutting is applied in the aforesaid direction, a tip portion of the vibration body is displaced relatively simply, thus, a depth of cut of a cutting edge of a tool is changed, and processing accuracy is declined.

(Patent Document 1) Unexampled Japanese Patent Application Publication No. 2000-52101

(Patent Document 2) Unexampled Japanese Patent Application Publication No. 2000-218401

(Patent Document 3) Unexampled Japanese Patent Application Publication No. Hei-9-309001

(Patent Document 4) Unexampled Japanese Patent Application Publication No. 2002-126901

SUMMARY

Therefore, an objective of the invention is to provide a vibration body for cutting that makes a process of cutting at high accuracy possible even when processing an optical surface having a large facing angle and a processing device in which the vibration body for cutting is incorporated.

Further object of the invention is to provide a molding die and an optical element made at high accuracy by the use of the aforesaid vibration body for cutting.

To solve the aforesaid problems, the first vibration body for cutting relating to the invention has a fixing portion for fixing a cutting tool for vibration cutting, and is equipped with a vibration body main part that transmits bending vibration and axial vibration (axial direction vibration) to the cutting tool fixed on the fixing portion. The present vibration body for cutting is characterized in that a length (hereinafter referred to as "a first width") in the direction (hereinafter referred to "a lateral direction") perpendicular to the prescribed bending vibration direction of the vibration body main part (hereinafter referred to as "a longitudinal direction") is made to be longer than a length in the prescribed bending vibration direction (hereinafter referred to as "a second width") in terms of a form of a cross section perpendicular to the axial direction of the vibration body main part, which is positioned in a supporting base region between a cross section perpendicular to the axial direction of the vibration body main part at the node position closest to the fixing portion (hereinafter, referred to as a closest node position) among node positions concerning bending vibration formed on the vibration body main part and a cross section perpendicular to the axial direction of the vibration body main part at a cutting tool rear end position where the end of the fixed cutting tool which is closest to the closest node position is located.

The second vibration body for cutting relating to the invention is equipped with a vibration body main part that has a fixing portion for fixing a cutting tool for vibration cutting, and transmits bending vibration and axial vibration to the cutting tool fixed on the fixing portion. In the present vibration body for cutting, it is characterized that a resonance frequency for the longitudinal bending vibration in the prescribed bending vibration direction of the vibration body main part is different from that for the lateral bending vibration in the direction perpendicular to the prescribed bending vibration.

The third vibration body for cutting relating to the invention is equipped with a vibration body main part that has a fixing portion for fixing a cutting tool for vibration cutting, and transmits bending vibration and axial vibration to the cutting tool fixed on the fixing portion. In the present vibration body for cutting, it is characterized that an antinode of the longitudinal bending vibration in the prescribed bending vibration direction of the vibration body main part is formed at least on the fixing portion or on its vicinity, and an antinode of the lateral bending vibration in the direction perpendicular to the prescribed bending vibration direction is formed on the portion including neither the fixing portion nor its vicinity. Incidentally, in this case, it is assumed that a region of ±1/10 or less of a wavelength in the resonance frequency is called the vicinity. In a general occasion where the resonance frequency is about several tens kHz and a material of the vibration body is a metal, a range of ±3 mm to ±10 mm represents the vicinity, because the resonance wavelength is in a range of about 30-100 mm.

BRIEF DESCRIPTION OF THE DRAWINGS

FIG. 2 (a), FIG. 2 (b) and FIG. 2 (c) represent respectively a top view, a side view and an end view, all for an assembly of a vibration body.

Figure 3:
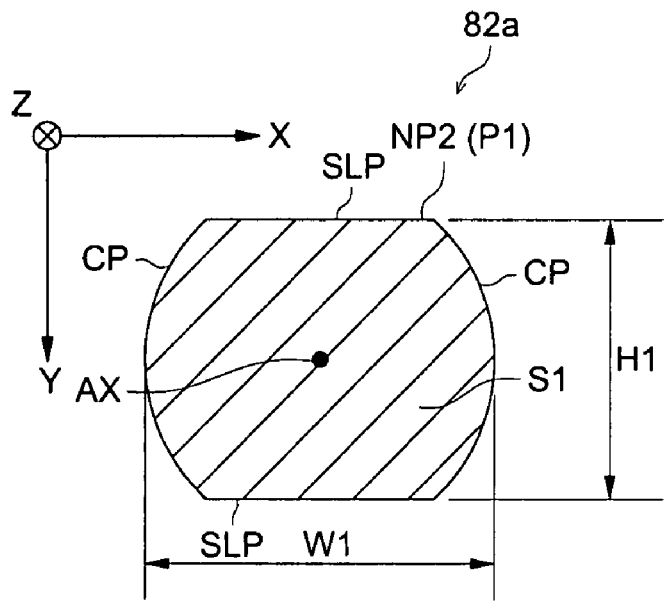
Figure 3:
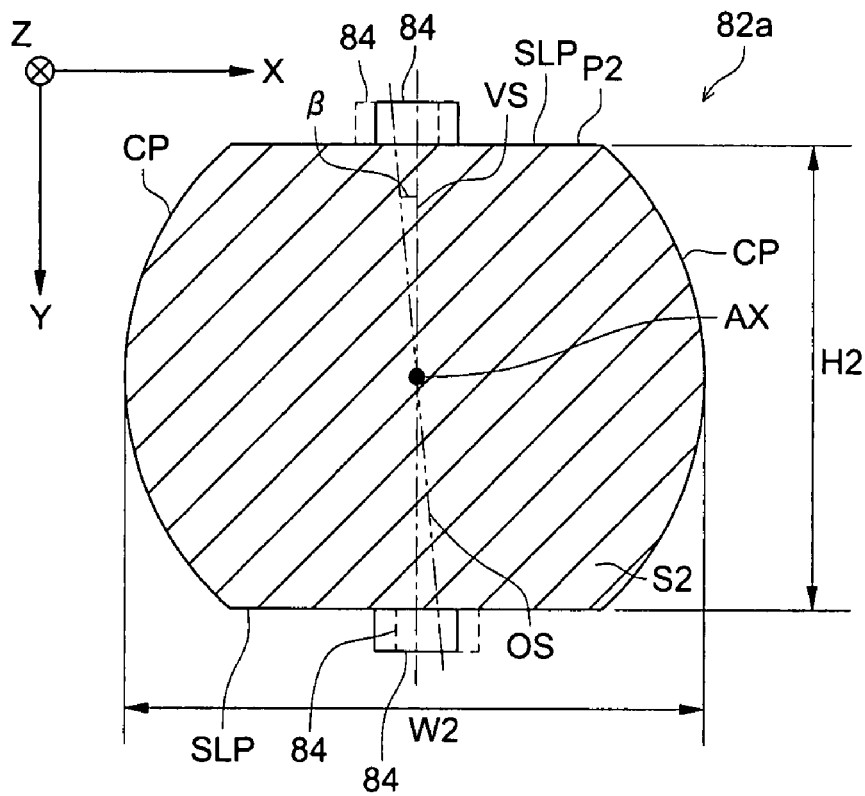

Each of FIG. 3 (a) and FIG. 3 (b) is an enlarged sectional view illustrating a form of the vibration body main part.

Figure 4:
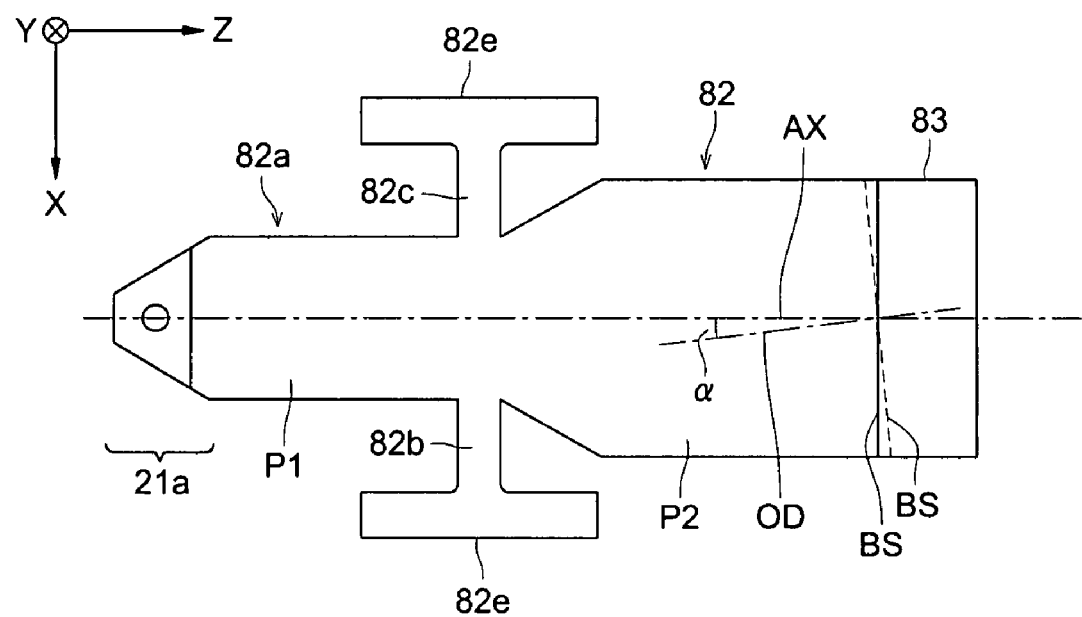

FIG. 4 (a) is a side view and an end view illustrating how an axial direction oscillator is mounted.

Figure 5:
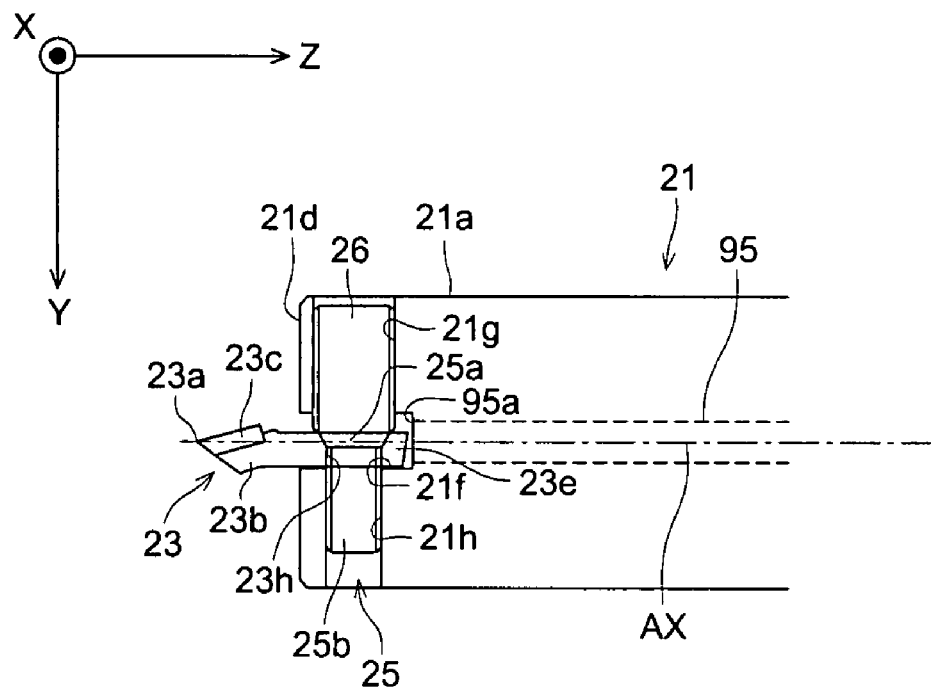
Figure 5:
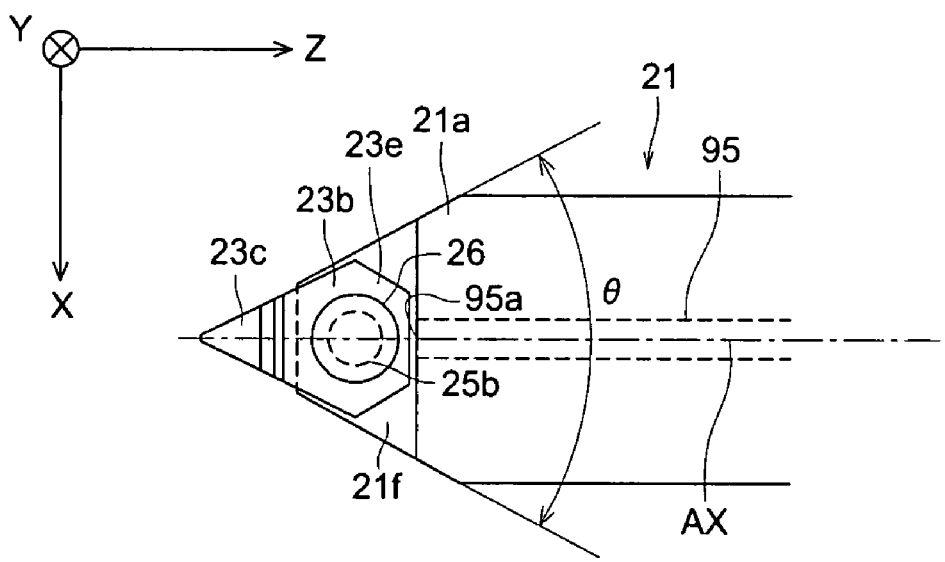

FIG. 5 (a) and FIG. 5 (b) represent respectively an end view and a top view, both for a tip of a tool portion.

Figure 6:
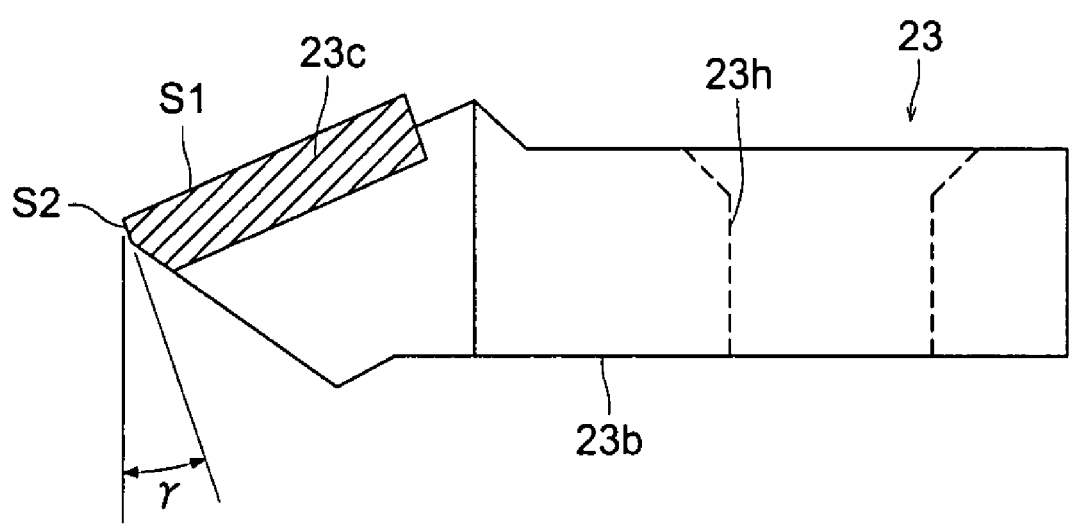

FIG. 6 is a side view of a cutting tool.

Figures 7A, 7B, 7C:
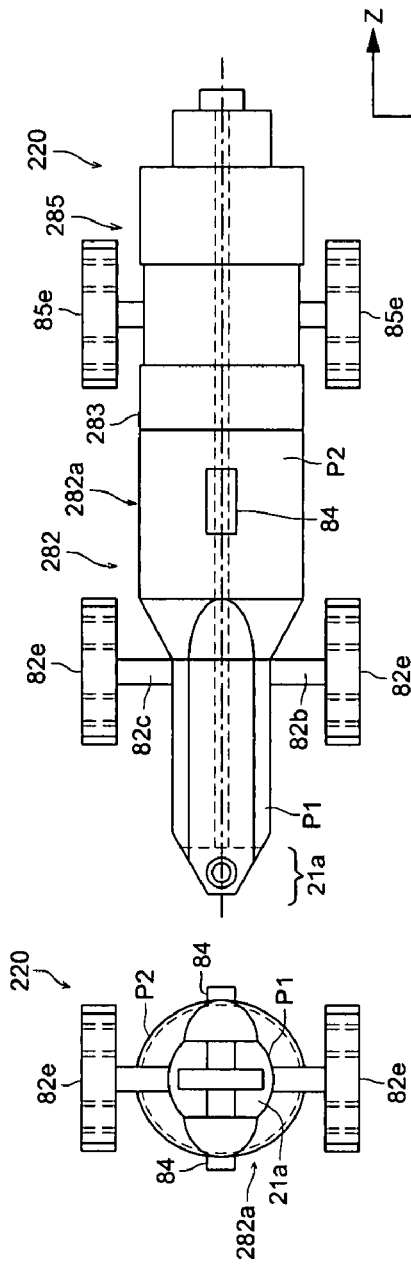

FIG. 7 (a), FIG. 7 (b) and FIG. 7 (c) represent respectively a top view, a side view and an end view, all for an assembly of a vibration body that is the first variation.

FIG. 8 (a), FIG. 8 (b) and FIG. 8 (c) represent respectively a top view, a side view and an end view, all for an assembly of a vibration body that is the second variation.

FIG. 9 (a), FIG. 9 (b) and FIG. 9 (c) represent respectively a top view, a side view and an end view, all for an assembly of a vibration body that is the third variation.

FIG. 10 (a), FIG. 10 (b) and FIG. 10 (c) represent respectively a top view, a side view and an end view, all for an assembly of a vibration body that is the fourth variation.

Figures 11A, 11B, 11C:
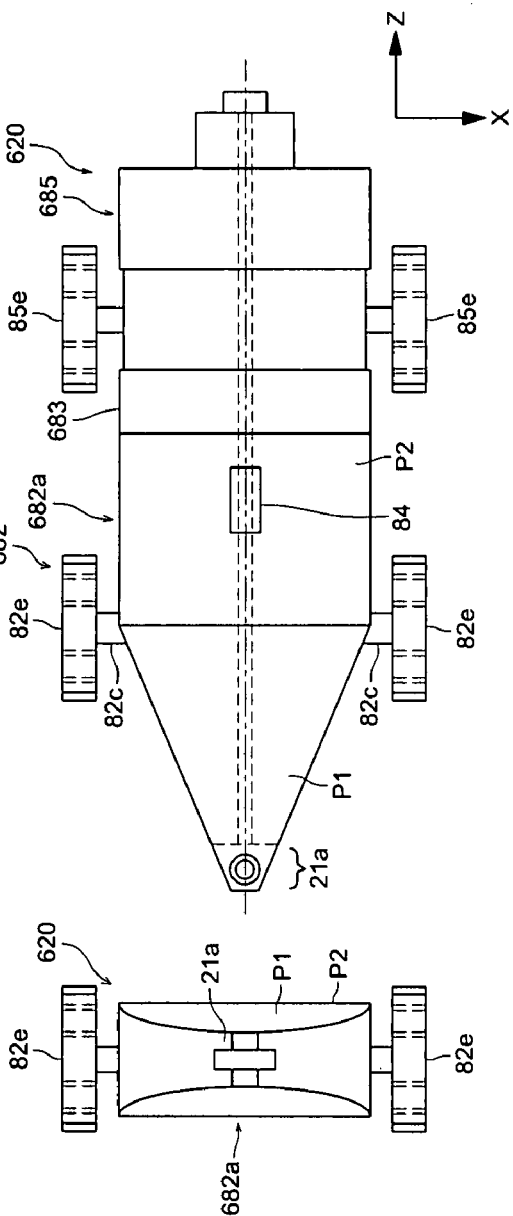

FIG. 11 (a), FIG. 11 (b) and FIG. 11 (c) represent respectively a top view, a side view and an end view, all for an assembly of a vibration body that is the fifth variation.

Figure 12:
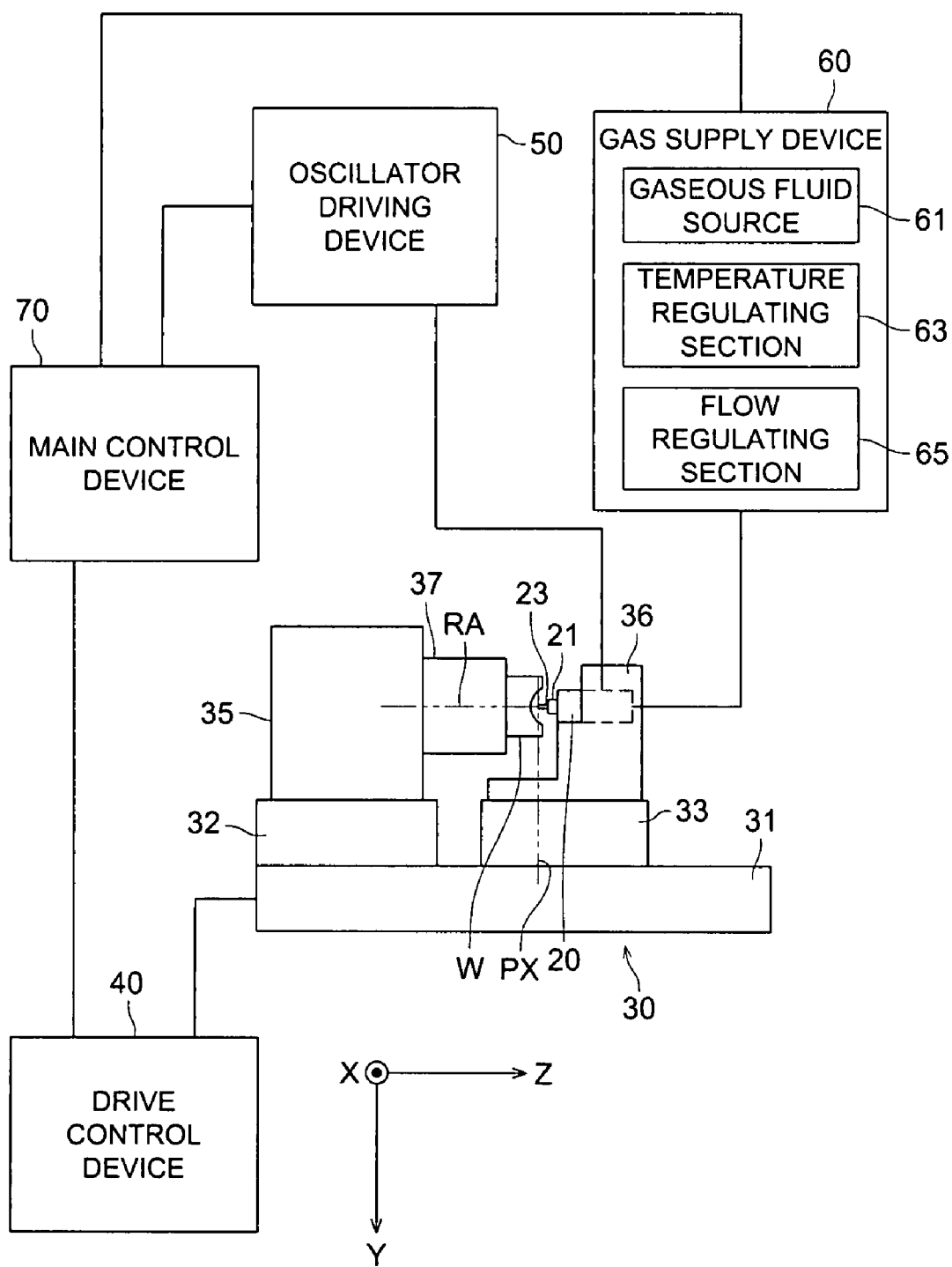

FIG. 12 is a block diagram illustrating a processing device of the second embodiment.

Figure 13:
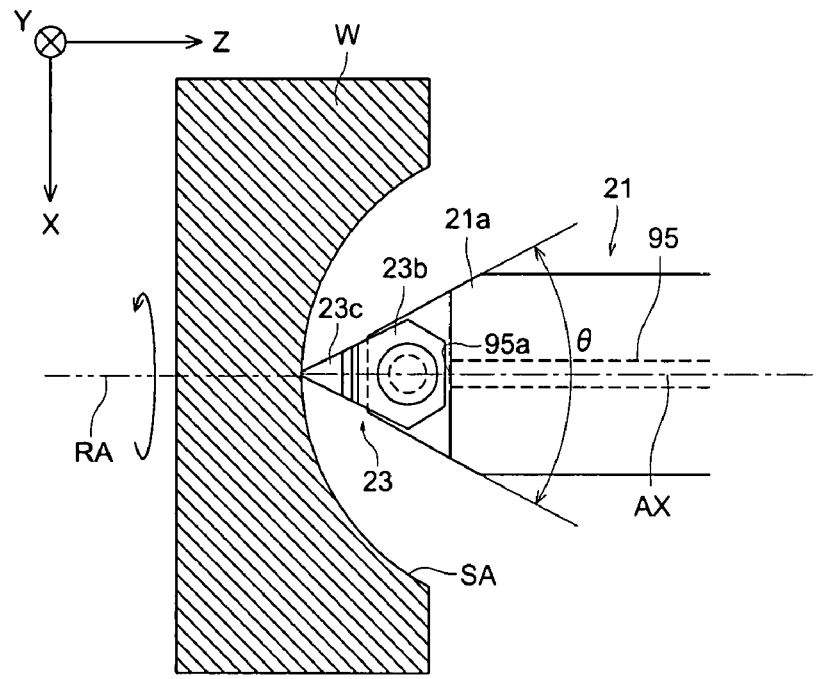
Figure 13:
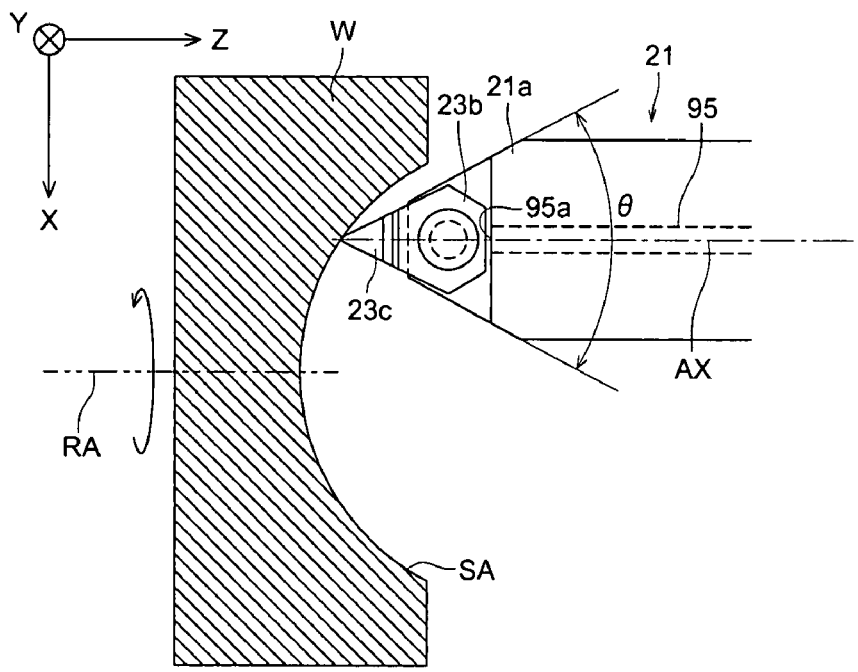

Each of FIG. 13 (a) and FIG. 13 (b) is an enlarged top view illustrating how the work is processed by the use of the processing device shown in FIG. 9.

Figure 14A:
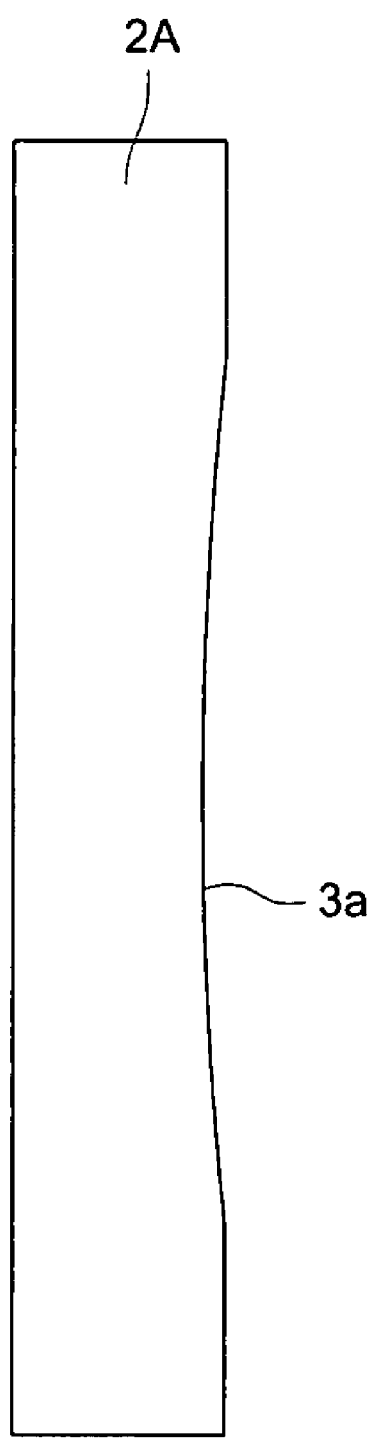
Figure 14B:
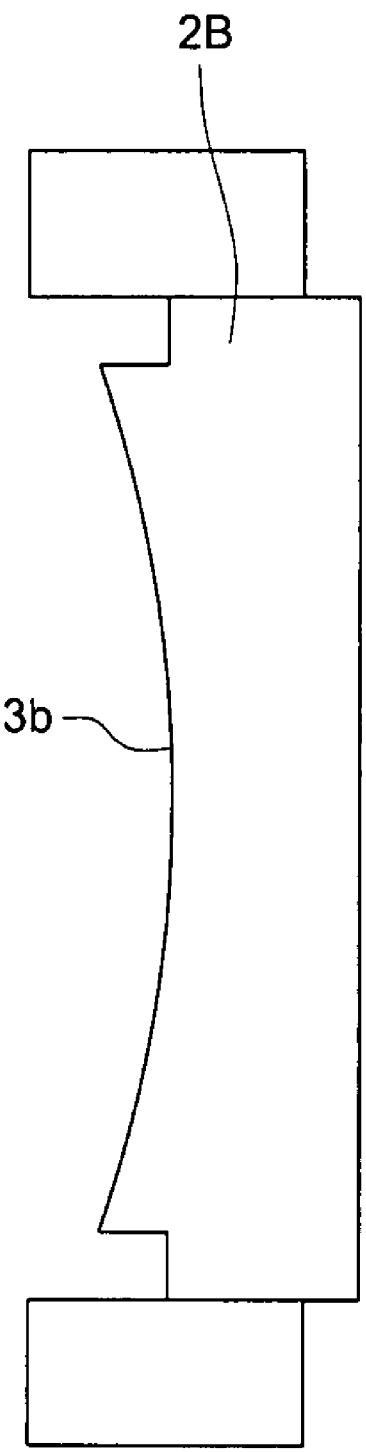

Each of FIG. 14 (a) and FIG. 14 (b) is a side sectional view of a molding die relating to the third embodiment.

Figure 15:
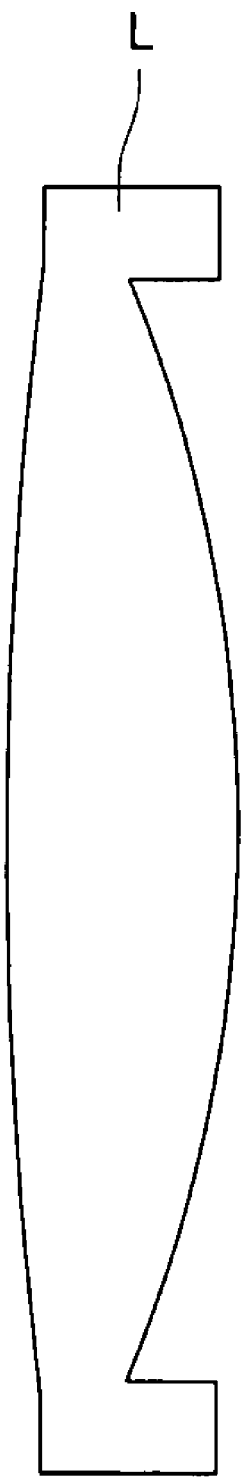

FIG. 15 is a side sectional view of a lens formed by the molding die shown in FIG. 14.

Figure 16:
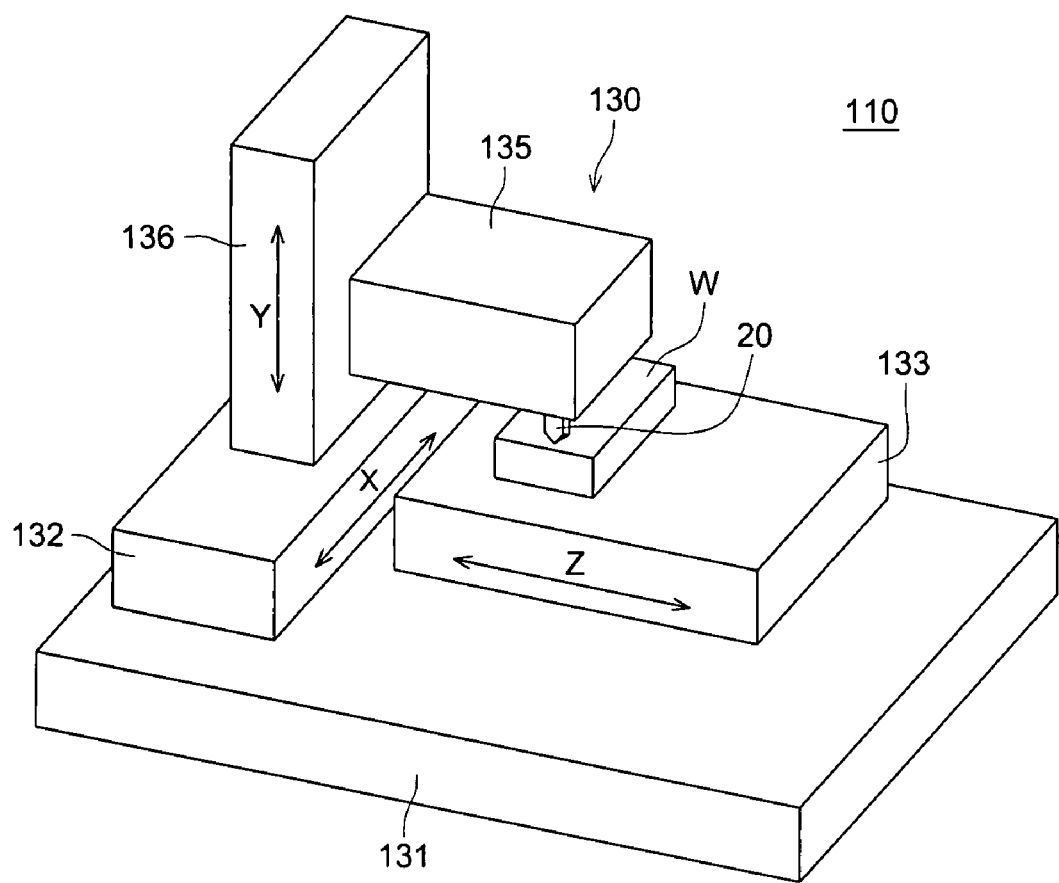

FIG. 16 is a diagram illustrating the structure of the processing device used in the first example.

Figure 17:
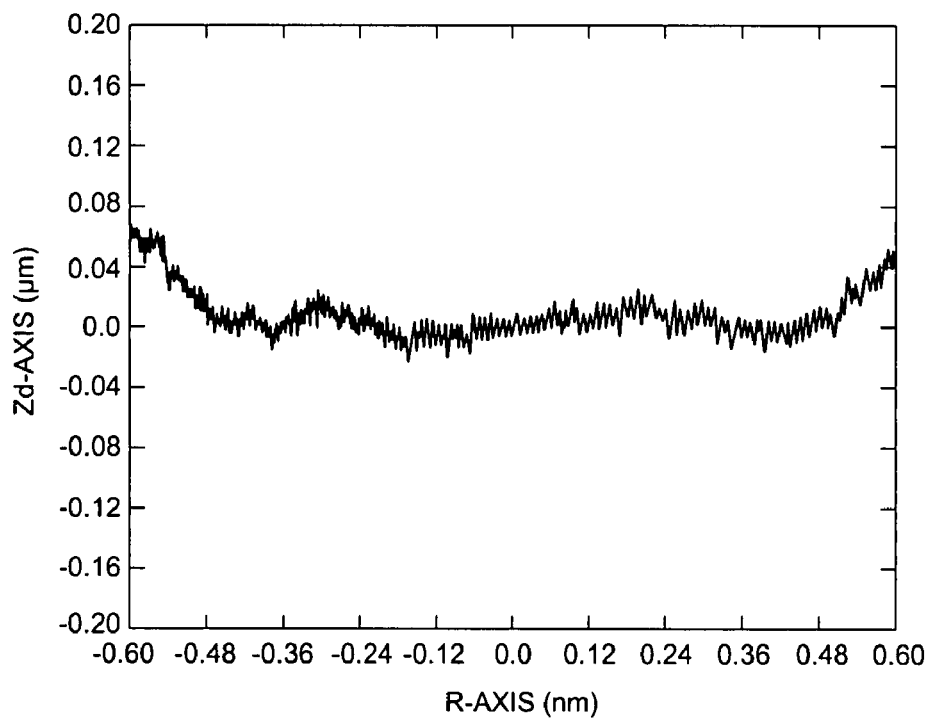

FIG. 17 is a graph illustrating the results of vibration cutting processing conducted by the method of the example.

Figure 18:
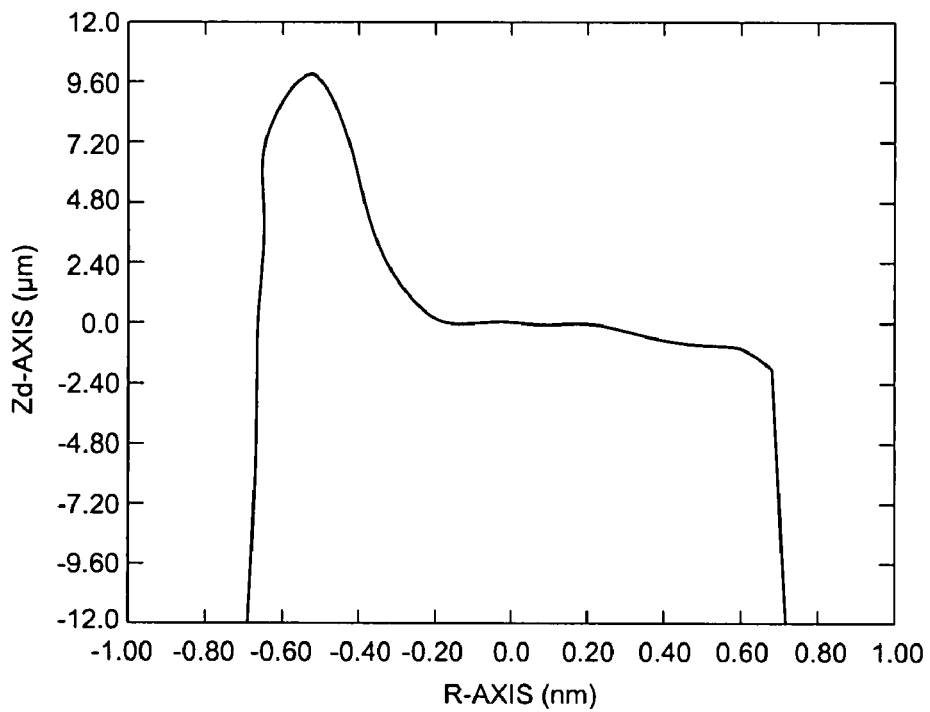

FIG. 18 is a graph illustrating the results of vibration cutting processing conducted by the method of the comparative example.

Figure 19:
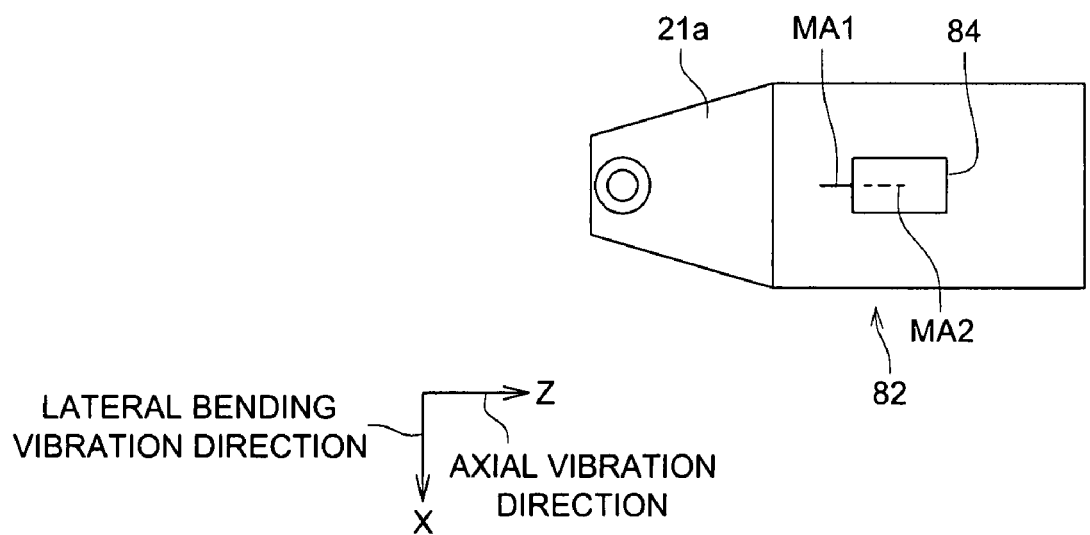

FIG. 19 is a partly-enlarged top view illustrating how to mount a bending oscillator for longitudinal bending vibration.

DETAILED DESCRIPTION OF THE PREFERRED EMBODIMENT

In the aforesaid vibration body for cutting, it is possible to enhance rigidity of the vibration body main part concerning the lateral direction that is perpendicular to the prescribed bending vibration direction, because a length in the direction perpendicular to the prescribed bending vibration direction of the vibration body main part is greater than a length in the prescribed bending vibration direction of the vibration body main part concerning a form of a cross section perpendicular to the axial direction of the vibration body main part in a portion of the supporting base region covering from the closest node position to the cutting tool rear end position. Therefore, even when a relatively large force in the lateral direction is applied on the vibration body main part in the course of processing of the object by a cutting tool, it is possible to control the fixing portion, namely, a position of the tip of the cutting tool, with a high precision. As a result, an object can be processed with a high precision by the vibration body for cutting that is controlled highly accurately. Further, it is easy to set longitudinal bending vibration in the prescribed bending vibration direction and lateral bending vibration in the direction perpendicular to the prescribed bending vibration direction to be different in terms of resonance frequency, because a length in the direction perpendicular to the prescribed bending vibration direction is greater than a length in the prescribed bending vibration direction, in the form of a cross section. Owing to this, it is possible to set an antinode of lateral bending vibration to the position shifted from the fixing portion, namely, the position of a tip of the cutting tool, while setting an antinode of longitudinal bending vibration at the fixing portion, namely, the position of a tip of the cutting tool. As a result, lateral bending vibration at the position of a tip of the cutting tool can be restrained, and a precision of processing the object can be enhanced.

In the specific embodiment of the invention, a length in the direction perpendicular to the prescribed bending vibration direction is 1.1 or more times and 10 or less times as long as a length in the prescribed bending vibration direction regarding the above vibration body for cutting. By making a length in the direction perpendicular to the prescribed bending vibration direction to be 1.1 or more times as long as a length in the prescribed bending vibration direction, it is possible to cause rigidity improvement concerning the lateral direction of the vibration body main part to be effective, and it is possible to restrain lateral bending vibration at a position of a tip of the cutting tool effectively. By making a length in the direction perpendicular to the prescribed bending vibration direction to be 10 or less times as long as a length in the prescribed bending vibration direction, it can be prevented that a size in the lateral direction of the vibration body main part grows excessively greater, and it can be prevented that the vibration body main part and an object to be processed interfere beyond necessity.

In another embodiment of the invention, at least one of a length in the direction perpendicular to the prescribed bending vibration direction and a length in the prescribed bending vibration direction decreases toward the fixing portion side, namely, the cutting tool rear end position from the closest node position, in the portion between a cross section perpendicular to the axial direction of the vibration body main part at the closest node position and a cross section perpendicular to the axial direction of the vibration body main part at the cutting tool rear end position. In this case, an amplitude of the bending vibration on the fixing portion side can be made larger to the desired level. Incidentally, the fixing portion and the cutting tool rear end position that supports the fixing portion are usually provided at the tip of a vibration body main part, and the fixing portion side represents a tip of the vibration body main part. Further, when the aforesaid portion of the vibration body main part is tapered smoothly, less noise is caused and transmission loss of vibration energy can be restricted.

In still another embodiment of the invention, the vibration body main part has a portion where a width of a cross sectional form that is perpendicular to the axial direction decreases stepwise toward the fixing portion side. In this case, it is possible to provide a portion that is tapered stepwise at a proper place along the axial direction of the vibration body main part. In that case, if a cross section in the longitudinal bending vibration direction is formed stepwise, it is possible to make an amplitude to be larger to the desired level for the part covering from the tapered portion to the tip, namely, to the fixing portion. Further, when a surface to be processed and a vicinity of the fixing portion interfere with each other in the course of processing, it is possible to avoid the interference by forming a cross section in the lateral bending vibration direction stepwise.

In still another embodiment of the invention, a contour of the cross sectional form perpendicular to the axial direction is oval, at the portion between the cross section perpendicular to the axial direction of the vibration body main part at the closest node position and the cross section perpendicular to the axial direction of the vibration body main part at the cutting tool rear end position. In this case, a singular point concerning a vibration is hardly formed, and abnormal vibration in an oblique direction or the like is hardly caused because the forms of the cross sections are smooth and sides in the longitudinal direction and sides in the lateral direction are connected smoothly.

In still another embodiment of the invention, a contour of the cross sectional form perpendicular to the axial direction has at least one linear portion, at the portion between the cross section perpendicular to the axial direction of the vibration body main part at the closest node position and the cross section perpendicular to the axial direction of the vibration body main part positioned at the cutting tool rear end position. In this case, the vibration body main part can be made in a simple shape for relatively easy manufacturing.

In the aforesaid vibration body for cutting, a resonance frequency of longitudinal bending vibration in the direction of the prescribed bending vibration of the vibration body main part is different from that of lateral bending vibration that is perpendicular to the direction of prescribed bending vibration. Therefore, it is possible to set an antinode of the lateral bending vibration to the position shifted from the fixing portion, namely, the position of a tip of a cutting tool, when an antinode of the longitudinal bending vibration is set to the fixing portion, namely, the position of a tip of a cutting tool.

Accordingly, displacement caused by lateral bending vibration at the position of a tip of a cutting tool can be restricted, and an object can be processed with a relatively high precision even when a facing angle of the object is great. Incidentally, in the foregoing, a range of a difference of resonance frequency is represented by ±5% or more. In this range, synchronized vibration is hardly caused, which is preferable for the purpose of restraining parasitic oscillation.

In the aforesaid vibration body for cutting, an antinode of the lateral bending vibration that is perpendicular to the prescribed bending vibration direction is formed on the portion where the fixing portion and the vicinity of the fixing portion are excluded, and therefore, displacement caused by lateral bending vibration at the fixing portion, namely, at the position of a tip of the cutting tool can be restricted, and an object can be processed with a relatively high precision even when a facing angle of the object is great.

In the specific embodiment of the invention, in each of above vibration bodies for cutting including the aforesaid first-third vibration bodies for cutting, there is further provided a holding member that is formed integrally with a node portion corresponding to at least one of node positions relating to bending vibrations or axial vibrations (axial direction vibrations) in the case when the vibration body main part vibrates in order to support the node portion. In this case, it can be restricted that the vibration body main part vibrates under the uncontrollable mode, and the vibration body main part can process the object with a high precision by the vibration that is highly controlled, because holding of the vibration body main part is stabilized, and the vibration of the vibration body main part is stabilized. Further, it is easy to maintain the state of vibration of the vibration body main part, and consistency and reproducibility of processing can be enhanced, because changes of holding positions for the vibration body main part are hardly caused even when relatively large force is applied on the vibration body main part.

In this case, the expression of "formed integrally" means that the holding member is fixed to the node portion on a jointless basis and that the surfaces of the members are fixed to each other, and the vibration body main part and the holding member do not necessarily need to be of the same material. In the meantime, when a material of the vibration body main part is different from that of the holding member, the aforesaid formed integrally includes this state regardless of the condition in which composition changes on the boundary between the vibration body main part and the holding member. The words "node portion" is a specific range including the vibration node relating to wave length of the vibration and the range is a round range that has a radius of one tenth of the wavelength of the vibration on the bending vibration plane with the node being the center of the range.

As for the word "node", the point at which the amplitude of vibration becomes minimum is called a node, for example, when detecting vibration amplitude by using detector which is used to put the contact shoe on the surface of the vibration body while the vibration body is vibrating.

The words "support the node portion" means to support the same range of the node portion on the bending vibration plane or a part of the range in the node portion. If a portion away from the node portion is supported, a part having a vibration amplitude is compulsorily fixed, resulting in large heat generation and low vibration efficiency.

When the vibration body is used under the condition where the bending vibration and an axial vibration are combined, it is preferable to make the node of the bending vibration and the node of the axial vibration conform to the position of the holding member.

In another embodiment of the invention, in each of the aforesaid vibration bodies for cutting, a vibration source that vibrates a cutting tool through the vibration body main part by giving vibrations to the vibration body main part is further provided. In this case, it is possible to cause necessary vibrations in the vibration body main part by supplying electric power to the vibration source.

In still another embodiment of the invention, in each of the aforesaid vibration bodies for cutting, the aforesaid vibration source has an axial vibration source (axial direction vibration source) that gives axial vibrations to the vibration body main part, and in the axial vibration source, the direction of vibration by the axial vibration source and the axial direction of the vibration body main part are established to have an inclination angle error of 5 minutes or less. In this case, vibrations coming from the axial vibration source are transmitted efficiently to the vibration body main part, and unintended bending vibrations caused by axial vibrations are hardly generated.

In still another embodiment of the invention, in each of the aforesaid vibration bodies for cutting, the aforesaid vibration source has a bending vibration source that gives bending vibrations to the vibration body main part, and the bending vibration source is mounted so that the direction of vibration by the bending vibration source and the direction of the prescribed bending vibration of the vibration body main part may have an inclination angle error of 5 minutes or less. In this case, it can be prevented that the longitudinal bending vibration in the direction of the prescribed bending vibration by the bending vibration source induces the lateral bending vibration in the direction perpendicular to the aforesaid longitudinal bending vibration.

The processing device relating to the invention is equipped with (a) the aforesaid vibration body for cutting and with (b) a driving unit that moves the vibration body for cutting while operating it.

In the aforesaid processing device, displacement of the vibration body for cutting explained above is conducted by a driving device, whereby, processing with high precision can be realized by the vibration body for cutting which can control the state of vibration of the vibration body main part.

A molding die relating to the invention has a transfer optical surface for forming an optical surface of an optical element created by the use of the aforesaid vibration body for cutting. In this case, it is possible to process efficiently and accurately the die having a concave surface and other various types of transfer optical surfaces.

The optical element relating to the invention is processed and created by the aforesaid vibration body for cutting. In this case, it is possible to obtain directly a highly accurate optical element having a concave surface and other various types of optical surfaces.

First Embodiment

Figure 1:
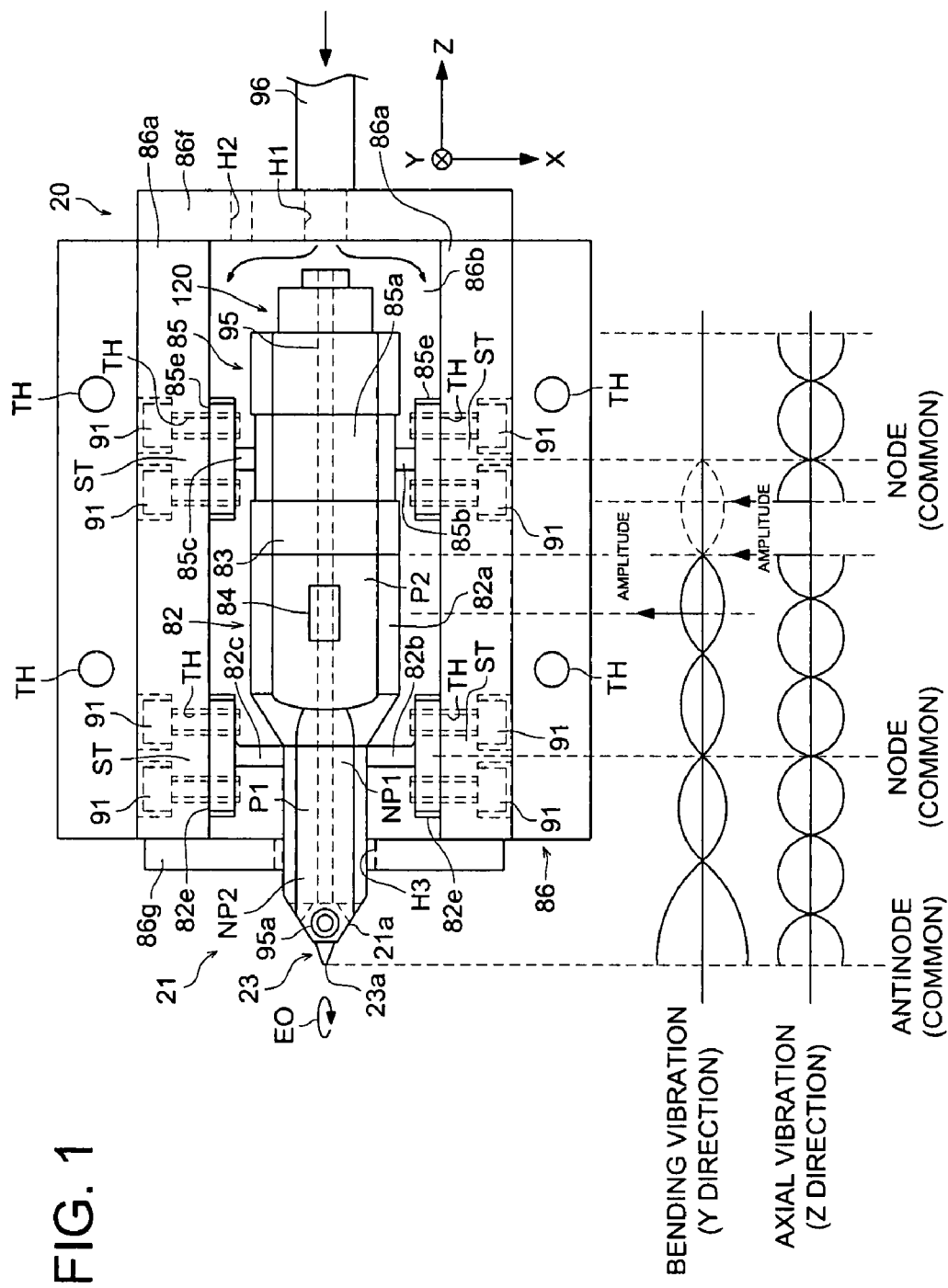
FIG. 1 is a top view of a vibration cutting unit of the first embodiment.

A vibration body for cutting relating to the First Embodiment of the invention will be explained as follows, referring to the drawings. FIG. 1 is a top view for illustrating the structure of a vibration cutting unit used in the case of processing a transfer optical surface of a molding die for molding optical elements such as lenses. Further, FIG. (a), FIG. (b) and FIG. (c) represent respectively an end view, a top view and a side view of an assembly of a vibration body incorporated in the vibration cutting unit shown in FIG. 1.

As shown in FIG. 1, vibration cutting unit 20 is equipped with cutting tool 23, vibration body for cutting 82, axial direction oscillator 83, bending oscillator 84, counterbalance 85 and with case member 86. Meanwhile, a portion of one set including vibration body for cutting 82, axial direction oscillator 83, bending oscillator 84 and counterbalance 85 constitutes assembly of a vibration body 120, and this assembly of a vibration body 120 can be regarded as an integrated vibration body for cutting that is driven from the outside to vibrate under the desired state.

In this case, cutting tool 23 is embedded in to be fixed to fixing portion 21a provided on the tip of tool portion 21 representing the tip side of vibration body for cutting 82 of vibration cutting unit 20. Cutting tool 23 whose tip 23a is serving as a cutting edge of diamond tip as described later, vibrates together with the tip of vibration body for cutting 82, namely, with fixing portion 21a as an open end of the vibration body for cutting 82 that is made to be in the state of resonance. In other words, the cutting tool 23 generates vibrations causing displacement in the Z direction, following vibrations in the axial direction of vibration body for cutting 82, and generates vibrations causing displacement in the direction of the prescribed bending direction in the Y direction (namely, in the plane including the prescribed bending vibration direction that is in parallel with YZ surface), following the longitudinal bending vibration of vibration body for cutting 82. As a result, tip 23a of cutting tool 23 is displaced at high speed, drawing elliptical orbit EO. Incidentally, in FIG. 1, elliptical orbit EO is drawn to spread slightly on XZ plane, for easy understanding. However, actual elliptical orbit EO drawn by the tip 23a exists on a plane that is in parallel with YZ plane, and it does not spread in the X axis direction.

The vibration body for cutting 82 is a vibration body for cutting formed integrally with a low linear expansion material in which an absolute value of the linear expansion coefficient is, for example, $2 \times 10^{-6}$ or less, and specifically, Invar material, super Invar material and stainless Invar material are used favorably as a material. Incidentally, as a material for the vibration body for cutting 82, cemented carbide may also be used, although its linear expansion coefficient is relatively great to be about $6 \times 10^{-6}$.

The Invar material in this case is an alloy containing Fe and Ni, and it is an iron alloy containing Ni of 36 atomic percent whose coefficient of linear expansion at a room temperature is normally $1 \times 10^{-6}$ or less. Its Young's modulus is as low as about a half of that of steel, and when this is used as a material of the vibration body 82, thermal expansion and contraction of the vibration body 82 are restricted, and temperature drift for the position of a cutting edge of cutting tool 23 held on the tip can be restricted.

Further, the super Invar material is an alloy containing at least Fe, Ni and Co, and it is an iron alloy containing Ni of 5 atomic percent or more and Co of 5 atomic percent or more, and its coefficient of linear expansion is normally about $0.4 \times 10^{-6}$ at a room temperature, which means that the super Invar material is more resistant for thermal expansion and thermal contraction than the aforesaid Invar material. Its Young's modulus is as low as about a half of that of steel, and when this is used as a material of the vibration body 82, thermal expansion and thermal contraction of the vibration body 82 are restricted, and temperature drift for the position of a cutting edge of cutting tool 23 held on the tip can be restricted.

The stainless Invar material means all alloy materials wherein a main component with 50 atomic percent or more is Fe, and an incident material containing 5 atomic percent or more is at least one of Co, Cr and Ni. Therefore, in this case, Kovar material is also included in this stainless Invar material. The coefficient of linear expansion of the stainless Invar material is normally $1.3 \times 10^{-6}$ or less at a room temperature. Incidentally, the coefficient of linear expansion of the Kovar material is normally $5 \times 10^{-6}$ or less at a room temperature. Young's modulus of the stainless Invar material is as low as about a half of that of steel, and when this is used as a material of the vibration body, thermal expansion and contraction of the vibration body 82 are restricted, and temperature drift for the position of a cutting edge of cutting tool 23 held on the tip can be restricted. Further, the stainless Invar material is suitable as a material of the structure to hold and fix the cutting tool 23, because it has an excellent characteristic of being much higher than the Invar material in terms of resistance to moisture, and it does not gather rust even when it is exposed to a cooling liquid for processing.

As a portion formed with the low linear expansion material stated above, the vibration body for cutting 82 is equipped with bar-shaped vibration body main part 82a that transmits vibrations to cutting tool 23, bar-shaped holding members 82b and 82c which hold vibration body main part 82a and flange portion 82e formed on the tip side on each of the holding members 82b and 82c.

The vibration body main part 82a is a bar-shaped member wherein a Z-axis direction is its own axis, namely, tool axis AX. This vibration body main part 82a has a two-step cylindrical outer shape whose diameter changes in the vicinity of node portion NP1 in the case of the illustration. In other words, the vibration body main part 82a is equipped with first portion P1 on the thin tip side and second portion P2 on the thick root side, and each of the portions P1 and P2 is maintained to be of a constant width along the Z axis direction representing its axis direction, and has, on the boundary between the portion P1 and portion P2, boundary portion P3 whose width of the cross section decreases stepwise toward the fixing portion 21a on the tip.

Incidentally, in the first portion P1, node portion NP2 concerning bending vibration on the tip side of node portion NP1 is in the closest node position that is the closest among the modes to the fixing portion 21a, and a portion SP supporting the fixing portion 21a on the root side of the fixing portion 21a, is in the supporting base region representing a tip portion of the first portion P1. That is, the supporting base region is a portion between a cross section perpendicular to the axial direction of the vibration body main part 82a at the node position closest to the fixing portion 21a among node positions concerning bending vibration formed on the vibration body main part 82a, namely, at a closest node position and a cross section perpendicular to the axial direction of the vibration body main part 82a at a cutting tool rear end position where the end of the fixed cutting tool 23 which is closest to the closest node position is located.

FIG. 3 (a) is a sectional view taken on line A-A at node portion NP2 in vibration body main part 82a, while, FIG. 3 (b) is a sectional view taken on line B-B in second portion P2 in vibration body main part 82a.

As is apparent from FIG. 3 (a), cross section S1 of node portion NP2 representing a closest node position that is on the tip side of vibration body main part 82a and is closest to fixing portion 21a has a form of a circle or an ellipse each of which is lacking its upper and lower portions (compressed oval form whose contour includes a pair of straight lines and a pair of circular arcs). In other words, the contour of cross section S1 of the first portion P1 has curved line portions CP constituting both ends in +X axis direction and -X axis direction and straight line portions SLP constituting both ends in +Y axis direction and -Y axis direction. In the first portion P1, curved line portions CP form left and right sides representing convex curved surfaces, and straight line portions SLP form upper and lower flat sides. In this case, the first width W1 corresponding to a length in the X axis direction perpendicular to the bending vibration direction (that is in parallel with Y axis and is longitudinal vibration axis and a direction perpendicular to tool axis AX) representing a reference of vibration body main part 82a is greater than the second width H1 corresponding to the length in the Y axis direction parallel to the aforesaid bending vibration direction (in the illustrated example, W1=1.2 H1). In this case, the relationship of W1>H1 holds not only for the node portion NP2 but also for the total portions covering from the node portion NP2 to the near side of the fixing portion 21a provided on the tip side. As stated above, in the vibration body for cutting 82 in the present embodiment, it is possible to enhance rigidity in the lateral direction representing ±X axis direction of the vibration body main part 82a, because the first width W1 in the lateral direction is greater than the second width H1 in the longitudinal direction, for cross section S1 of the portion covering from the node portion NP2 to the near side of the fixing portion 21a.

Therefore, the position of the fixing portion 21a, namely, of tip 23a of cutting tool 23 can be controlled with high precision even when relatively large force is applied on the vibration body main part 82a in the course of processing of an object by cutting tool 23. Consequently, an object can be processed with high precision by vibration body for cutting 82 that is controlled highly accurately. Further, in the vibration body for cutting 82 of the present embodiment, the first width W1 in the lateral direction is greater than the second width H1 in the longitudinal direction as stated above. Therefore, it is easy to set longitudinal bending vibration in the Y axis direction in the bending vibration direction and lateral bending vibration in the X axis direction perpendicular to this bending vibration direction to different resonance frequencies. Owing to this, it is possible to set the antinode of lateral bending vibration to the position shifted from the fixing portion 21a, namely, from tip 23a of cutting tool 23, while setting the antinode of longitudinal bending vibration to the fixing portion 21a, namely, to tip 23a of cutting tool 23. Consequently, lateral bending vibration on the tip 23a of the cutting tool 23 can be restrained, and processing accuracy for the object can be enhanced.

Meanwhile, in the case of the present embodiment, the relationship of W1>H1 holds concerning cross section S1 perpendicular to the Z axis direction, for the whole first portion P1 from holding members 82b and 82c to on the tip side. In this case again, it is possible to prevent the lateral bending vibration in the X axis direction from growing greater at the fixing portion 21a, while enhancing rigidity in the X axis direction of vibration body main part 82a.

It is further possible to arrange tip 23a of cutting tool 23 relatively freely for an object by making the first portion P1 to be relatively slender, as in the present embodiment, thus, an extent of freedom for a processed form is raised.

Incidentally, the aforesaid embodiment is an example wherein a contour of cross section S1 of the first portion P1 can be changed accordingly within a range where the first width W1 in the lateral direction is greater than the second width H1 in the longitudinal direction. However, it is preferable that the ratio of the first width W1 in the lateral direction to the second width H1 in the longitudinal direction is in a range of 1.1-10. By making the ratio of the first width W1 to the second width H1 to be 1.1 or more, the improvement in rigidity of the vibration body main part 82a in the X axis direction can be made effective, and lateral bending vibration at the tip 23a of cutting tool 23 can be restrained effectively. On the other hand, by making the ratio of the first width W1 to the second width H1 to be 10 or less, it is possible to prevent a size of the vibration body main part 82a in the X axis direction from growing excessively and to prevent the vibration body main part 82a and an object to be processed from interfering each other.

As shown in FIG. 3 (b), cross section S2 of the second portion P2 constituting the root side of the vibration body main part 82a also has a form of a circle or an ellipse each of which is lacking its upper and lower portions, in the same way as in the first portion P1. In other words, the contour of the cross section S2 of the second portion P2 has curved line portions CP constituting both ends in +X axis direction and -X axis direction and straight line portions SLP constituting both ends in +Y axis direction and -Y axis direction. Bending oscillator 84 is mounted on each of the upper side and the lower side corresponding to the straight line portions SLP. In this case, in the cross section S2 of the vibration body main part 82a, the first width W2 corresponding to the length in the X axis direction perpendicular to the bending vibration direction is greater than the second width H2 corresponding to the length in the Y axis direction parallel with the bending vibration direction. Due to this, rigidity of the vibration body main part 82a concerning the lateral direction representing the ±X axis directions can be enhanced, and it becomes easy to set longitudinal bending vibration in the Y axis direction parallel with the bending vibration direction and lateral bending vibration in the X axis direction perpendicular to the foregoing to different resonance frequencies. Consequently, lateral bending vibration at the tip 23a of cutting tool 23 can be restrained, and a position and the state of vibration of fixing portion 21a, namely the tip 23a of cutting tool 23 can be controlled with high precisions, thus, processing accuracy for the object can be enhanced.

Returning to FIGS. 1 and 2, two holding members 82b and 82c extending to the lateral directions, namely, ±X directions respectively from a sidewall of the vibration body main part 82a support the vibration body main part 82a with node portion NP1 in a way not to disturb operations of the vibration body main part 82a. In the case of the illustration wherein each of the holding members 82b and 82c has a cylindrical external form, it is possible to replace them with those having an external form such as, for example, a square pole, other polyhedral poles or an elliptic cylinder. The root side of each of holding members 82b and 82c is formed integrally with node portion NP1, and the tip side of each of holding members 82b and 82c supports square flange portion 82e extending in the direction perpendicular to the holding member. For further details, both holding members 82b and 82c support node portion NP1 of the vibration body main part 82a at the position of side surfaces facing each other in the X direction, and an end face of each flange portion 82e provided on the tip side of each of both holding members 82b and 82c is fixed on case member 86 to be in contact with an inner surface of case member 86. In the foregoing, the holding members 82b and 82c are extending in the X direction perpendicular to the bending vibration direction through tool axis AX of the vibration body main part 82a, and they allow a rotation around X axis of node portion NP1, namely, a longitudinal bending vibration whose node of vibration is at this point, and they restrict slightly a rotation around Y axis of node portion NP1, namely, a lateral bending vibration whose node of vibration is at this point.

Flange portion 82e is in a form of square plate, and female screw FS is formed on each of four locations on four corners to pass through it. In each female screw FS, there is screwed a tip of bolt screw 91 representing a connecting member to be fixed, through the hole TH provided on side wall portion 86a of case member 86 corresponding to each female screw. Owing to this, an end face of flange portion 82e is fixed firmly to be in contact with an inner surface of sidewall portion 86a, thus, holding members 82b and 82c are positioned on case member 86 precisely to be fixed. In other words, the vibration body main part 82a is fixed under the state where the vibration body main part 82a is separated from the inner surface of case member 86 to be positioned precisely in the case member 86 to be supported. Female screw FS provided on flange portion 82e and bolt screw 91, in this case, serve as a connecting device for fixing tips of holding members 82b and 82c. Meanwhile, with respect to a thread groove and a screw thread formed respectively on female screw FS and bolt screw 91, it is possible to select either one of a right-handed screw and a left-handed screw to employ, by considering prevention of looseness for clamping.

In the mechanism stated above, vibration body for cutting 82 supported in case member 86 is vibrated by axial direction oscillator 83 to be mentioned later, to be in the state of resonance where the standing wave causing displacement locally in the Z direction is formed. Further, the vibration body for cutting 82 is vibrated also by bending oscillator 84, to be in the state of resonance where the standing wave causing displacement locally in the Y axis direction is formed. In this case, node portion NP1 fixed with the root side of holding members 82b and 82c is serving as a node common to axial vibration and bending vibration for the vibration body for cutting 82, which can prevent axial vibration and bending vibration from being disturbed by holding members 82b and 82c.

In the meantime, holding members 82b and 82c, flange portion 82e and vibration body main part 82a are integrally formed. In other words, the root portion for respective holding members 82b and 82c is fixed seamlessly on fixing portion FP of vibration body main part 82a. Therefore, the vibration body for cutting 82 is formed by cutting massive materials such as bar-shaped low linear expansion materials. When manufacturing the vibration body for cutting 82, preliminary processing by a cutting device such as a milling machine, for example, and finishing processing to cut external forms of holding members 82b and 82c and of flange portion 82e to aimed forms by a cutting device such as a machining center are combined for the manufacturing. When vibration body main part 82a and holding members 82b and 82c are cut integrally as stated above, the vibration body for cutting 82 can be manufactured from one material with sufficient strength. Owing to this, the vibration body for cutting 82 can be vibrated under the aimed state, thus, its strength can be enhanced sufficiently, and its holding rigidity can be extremely enhanced. In this case, flange portion 82e and holding members 82b and 82c can be fixed through welding, although their strength may be slightly lowered. Incidentally, in place of the cutting processing mentioned above, a method of machine work such as grinding or electrodischarge machining can be used for manufacturing of vibration body for cutting 82.

The vibration body for cutting 82 can also be formed integrally through molding, in place of the aforesaid cutting by machine work. In this case, it is preferable that processes to conduct finish processing accurately for external forms of respective portions 82a, 82b and 82c of the vibration body for cutting 82 and flange portion 82e after molding are provided. Further, for the vibration body for cutting 82, the root sides of both holding members 82b and 82c can be fixed to vibration body main part 82a through welding, after causing the root sides of the holding members 82b and 82c to be engaged with a concave portion or screw holes formed on the sides of the vibration body main part 82a. It is further possible to fix the root sides of both holding members 82b and 82c on the sides of the vibration body main part 82a directly through welding, without forming a concave portion or a screw hole on the side of the vibration body main part 82a.

Axial direction oscillator 83 is a vibration source, namely an axial vibration source which is formed by piezoelectric element (PZT) or super-magnetostrictor, and is connected to the end surface on the root side of vibration body for cutting 82, and it is connected to an oscillator driving device (to be described later) through unillustrated connectors and cables. The axial direction oscillator 83 gives longitudinal waves in the Z direction, namely, axial vibrations to the vibration body for cutting 82 by acting based on drive signals coming from the oscillator driving device and by conducting expansion and contraction vibration at high frequency.

FIG. 4 (*a*) is a diagram illustrating how axial direction oscillator 83 is mounted on vibration body for cutting 82. The direction of a vibration of axial direction oscillator 83 agrees with the direction of axial vibration of vibration body main part 82*a*. In this case, the axial vibration of the vibration body main part 82*a* is formed along tool axis AX of the vibration body main part 82*a*, and the tool axis AX is determined in accordance with a form of the vibration body main part 82*a*. Namely, the vibration body main part 82*a* has a form that is symmetrical in ±X directions with respect to the tool axis AX and that is symmetrical in ±Y directions with respect to the tool axis AX, in any of the first and the second portions P1 and P2. Accordingly, the vibration body main part 82*a* vibrates in the axial direction along the tool axis AX when longitudinal vibration along the tool axis AX is given at end surface BS of the vibration body main part 82*a*. However, when the longitudinal vibration is given in the direction inclined by angle α from the tool axis AX of the vibration body main part 82*a*, there are possibilities that lateral bending vibrations which are perpendicular to tool axis AX and are parallel with XZ plane and longitudinal bending vibrations which are perpendicular to tool axis AX and are parallel with YZ plane in addition to axial vibrations parallel with tool axis AX are generated. Among them, lateral bending vibrations which are parallel with XZ plane needs to be avoided as far as possible, because they vibrate tip 23*a* of cutting tool 23 in the undesirable ±X directions, and longitudinal bending vibrations which are parallel with YZ surface also needs to be avoided because there are possibilities that they disorganize and disturb longitudinal bending vibrations to be formed on tip 23*a* of cutting tool 23. Therefore, end surface BS of vibration body main part 82*a* is finished to be perpendicular precisely to tool axis AX, and uniform vibrations are given to axial direction oscillator 83. In this case, the axial direction oscillator 83 can make the vibration body main part 82*a* to conduct longitudinal vibration, namely, axial vibration only in the tool axis AX direction. As shown exaggeratedly in the diagram, actual vibration direction OD of the axial direction oscillator 83 is in the state where it is tilted by angle α from tool axis AX of the vibration body main part 82*a*. This angle α corresponds to an error of the mounting angle, and generation of bending vibrations on the vibration body main part 82*a* can be restricted by reducing the angle α. In the specific example, when the angle α corresponding to the error of mounting angle is made to be 5 minutes or less, bending vibrations caused by the axial direction oscillator 83 are hardly generated on the vibration body main part 82*a*, and vibrations coming from the axial direction oscillator 83 are transmitted efficiently to the vibration body main part 82*a*.

Bending oscillator 84 is a vibration source, namely a bending vibration source, which is formed by piezoelectric element and super-magnetostrictor, and is connected to the side surface on the root side of vibration body for cutting 82, and it is connected to an oscillator driving device (to be described later) through unillustrated connectors and cables. The bending oscillator 84 operates based on drive signals coming from the oscillator driving device, and gives transverse waves, namely, bending vibrations in the Y direction in the illustrated example to the vibration body for cutting 82 by vibrating at high frequency.

How to mount the bending oscillator 84 on the vibration body for cutting 82 will be explained as follows, referring to FIG. 3 (*b*). The vibration direction of the bending oscillator 84 agrees with the direction of longitudinal bending vibration of the vibration body main part 82*a*. In this case, the vibration body main part 82*a* has a form that is symmetrical in ±X directions with respect to longitudinal cross section VS, and longitudinal bending vibrations of the vibration body main part 82*a* are formed along longitudinal cross section VS of the vibration body main part 82*a*. Accordingly, the vibration body main part 82*a* conducts longitudinal bending vibrations along longitudinal cross section VS when bending vibrations along longitudinal cross section VS are given on straight line portion SLP. However, when bending vibrations are given in the direction inclined by angle β from longitudinal cross section VS of the vibration body main part 82*a*, there are possibilities that lateral bending vibrations which are perpendicular to longitudinal cross section VS and in parallel with XZ plane in addition to longitudinal bending vibrations parallel with longitudinal cross section VS are generated. The lateral bending vibrations of this kind needs to be avoided as far as possible, because it vibrates tip 23*a* of cutting tool 23 in the undesirable ±X directions. Therefore, straight line portion SLP of the vibration body main part 82*a* is finished to be perpendicular precisely to longitudinal cross section VS, and bending oscillator 84 is arranged so that it may be at the center of the straight line portion SLP, and uniform vibrations are given to the bending oscillator 84. In this case, the bending oscillator 84 can make the vibration body main part 82*a* to conduct longitudinal vibration along longitudinal cross section VS. As shown exaggeratedly in the diagram, actual vibrating plane OS of the bending oscillator 84 is in the state where it is tilted by angle β from longitudinal cross section VS of the vibration body main part 82*a*. This angle β corresponds to an error of the mounting angle, and generation of lateral bending vibrations on the vibration body main part 82*a* can be restricted by reducing the angle β.

Meantime, when the bending oscillator 84 is mounted to be tilted more than a certain extent, in addition to longitudinal bending vibrations parallel with longitudinal cross section VS, lateral bending vibrations in the ±X directions intersecting the longitudinal bending vibrations is excited. When the state of this kind is created, desired longitudinal bending vibrations are overlapped with unwanted lateral bending vibrations intersecting the longitudinal bending vibrations, and when frequencies for both vibrations are different from each other, complicated curved lines indicating fluctuations on vibrating surfaces are formed, and stabilized processing cannot be realized. Further, if a frequency and a phase of the desired longitudinal bending vibrations agree respectively with a frequency and a phase of the unwanted lateral bending vibrations intersecting the desired longitudinal bending vibrations, a locus of vibration draws a tilted straight line, whereby, a touch between a right side of the tip 23*a* of cutting tool 23 and a surface to be processed of the object becomes different from a touch between a left side of the tip 23*a* of cutting tool 23 and a surface to be processed of the object, and a cut form does not become symmetrical even when the cutting tool 23 is moved to cut in symmetrically. Further, when frequencies of the longitudinal bending vibration and the lateral bending vibration are the same as each other and phases of them are different from each other, the tip 23*a* of cutting tool 23 draws a Lissajous figure and vibrates complicatedly, resulting in no repeatability of cutting processing.

On the other hand, by making mounting angle β of bending oscillator 84 to be 5 minutes or less, lateral bending vibrations caused by bending oscillator 84 are hardly generated for the vibration body main part 82*a*, and vibrations from the bending oscillator 84 are transmitted efficiently to vibration body main part 82*a*. For example, when an amplitude of the desired longitudinal bending vibrations is 5 μm, an amplitude of unwanted lateral bending vibrations becomes about 8 nm at the tip 23*a*, and it has become possible to draw elliptical orbit EO under vibration locus errors of 10 nm or less which is necessary for high precision processing of an optical surface.

In the specific example, an oscillator and a vibration body were incorporated so that mounting angle β for bending oscillator 84 may become about zero, and an optical surface was actually processed. As a result, slight abrasion was observed on the tip 23a of cutting tool 23, however the abrasion was observed on the symmetrical portions, and a form of the optical surface was symmetrical, whereby, the aimed form of optical surface was obtained by conducting form correction processing. In other words, under the condition where an inclination of bending oscillator 84 was 5 minutes or less, imbalanced abrasion of the tip 23a of in the course of optical surface processing was reduced, and a cut form in accordance with an amount of a cut in by a cutting edge of the tip 23a was created efficiently, thus, the processed form of optical surface satisfying required accuracy was obtained. On the other hand, when the optical surface was processed actually after making the mounting angle β for bending oscillator 84 to be greater than 5 minutes in the assembly of a vibration body of a conventional type, a cutting edge on only one side of the tip 23a of cutting tool 23 was worn away greatly, and a processed form was in an asymmetric form wherein a portion processed by a worn portion of the tip 23a was protruded.

Counterbalance 85 is fixed to be opposite to vibration body for cutting 82 with respect to axial direction oscillator 83. The counterbalance 85 is a vibration body for cutting that is formed integrally with vibration body for cutting 82 by the same material as that of the vibration body for cutting 82, and specific materials used suitably for the counterbalance 85 include low linear expansion materials such as Invar material, super-Invar material and stainless Invar material.

The counterbalance 85 is equipped with columnar vibration body main part 85a fixed on one end of the axial direction oscillator 83 on a coaxial basis, bar-shaped holding members 85b and 85c supporting node portion NP3 of vibration body main part 85a and flange portion 85e formed on the tip side at each of holding members 85b and 85c. Though each of the two holding members 85b and 85c extending in ±X directions from a side wall of the vibration body main part 85a has a columnar external form in the illustration, it is possible to replace them with those having an external form such as, for example, a square pole, other polyhedral poles or an elliptic cylinder. The root side of each of holding members 85b and 85c is formed integrally with node portion NP3, and the tip side of each of holding members 85b and 85c supports square flange portion 85e extending in the direction perpendicular to the holding member. In other words, both holding members 85b and 85c support node portion NP3 of the vibration body main part 85 at the position of side surfaces facing each other in the X direction, and an end surface of each flange portion 85e provided on the tip side of each of both holding members 85b and 85c is fixed by bolt screw 91 on case member 86 to be in contact with an inner surface of case member 86.

Counterbalance 85 supported in case member 86 by the aforesaid mechanism together with vibration body for cutting 82 is vibrated by axis direction oscillator 83 to be in the resonance state where a standing wave causing displacement locally in the Z direction is formed. In this case, node portion NP3 fixed with the root side of holding members 85b and 85c is serving as a common node for axial vibrations and bending vibrations for the counterbalance 85, which can prevent axial vibrations and bending vibrations from being disturbed by the holding members 85b and 85c.

Incidentally, in the counterbalance 85, holding members 85b and 85c, flange portion 85e and vibration body main part 85a are formed integrally. In other words, the counterbalance 85 is formed integrally and seamlessly in the same way as in vibration body for cutting 82. The counterbalance 85 is formed by cutting, for example, a massive material representing a bar-shaped material. Owing to this, the counterbalance 85 can be vibrated under the aimed state, and its strength can be enhanced sufficiently and its holding rigidity can be enhanced extremely. The counterbalance 85 can also be formed integrally through molding. Further, the counterbalance 85 can also be one made so that the root side of holding members 82b and 82c is fixed on the side of vibration body main part 85a through welding.

Case member 86 is a portion where assembly of a vibration body 120 composed of vibration body for cutting 82 and counterbalance 85 is supported and fixed inside. The case member 86 is one for fixing vibration cutting unit 20 to processing device (which will be described later) which drives the fixing vibration cutting unit 20. Therefore, on bottom portion 86b of the case member 86, holes TH are formed for fixing the case member on the processing device at optimum positions. Further, on a pair of side wall portions 86a formed integrally with the bottom portion 86b, holes TH are also formed for fixing flange portions 82e and 85e extending respectively from vibration body for cutting 82 and counterbalance 85, at suitable locations. The portion where these holes TH are formed serves as supporting portion ST for supporting the vibration body for cutting 82 and counterbalance 85. In this case, side wall portion 86a and bottom portion 86b of case member 86 are seamlessly and integrally formed as a main body portion. Due to this, the assembly of a vibration body 120 can be positioned and supported accurately in the case member 86, and not only its supporting strength but also strength of the case member 86 can be enhanced sufficiently and then its holding rigidity can be enhanced extremely. The sidewall portion 86a and the bottom portion 86b can be formed with the same material (preferably, a low linear expansion material) as that, for example, of the vibration body for cutting 82. The main body portion wherein the sidewall portion 86a and the bottom portion 86b are united solidly can be formed by cutting, for example, a massive material representing a bar-shaped material, or can be formed integrally through molding, and it can be formed by welding a plurality of plate materials.

Rear end plate 86f is fixed hermetically on an end surface on one side of case member 86, front end plate 86g is fixed hermetically on an end surface on the other side of case member 86 and a top plate (not shown) is fixed hermetically on an upper part of case member 86. On the rear end plate 86f, opening H1 to be connected to gas-supply pipe 96 is formed, and opening H2 through which a connector and a cable extending from oscillators 83 and 84 pass is also formed. The gas-supply pipe 96 is connected to a gas supply device (which will be described later), and pressurized and dried air established to the desired flow rate and temperature is supplied. On the other hand, on the front end plate 86g, opening H3 is formed for allowing tool portion 21 of vibration cutting unit 20 to pass through.

In the aforesaid vibration cutting unit 20, vibration body for cutting 82, axial direction oscillator 83 and counterbalance 85 are connected and fixed through, for example, brazing, which makes efficient vibration of axial direction oscillator 83 possible.

Further, on the center of axle for the vibration body for cutting 82, axial direction oscillator 83 and counterbalance 85, there is formed through hole 95 that passes through them by traversing their joint surfaces, and pressurized and dried air coming from the gas-supply pipe 96 runs through the through hole 95. In short, the through hole 95 is a supply path for feeding out pressurized and dried air, and it constitutes a cooling device for cooling vibration cutting unit 20 from its inside, together with an unillustrated gas supply device and the gas-supply pipe 96. The tip portion of the through hole 95 is communicated with a holding groove in which the cutting tool 23 is inserted to be fixed, so that pressurized and dried air introduced into the through hole 95 may be supplied to the circumference of the cutting tool 23. Even when the cutting tool 23 is fixed, the end of the through hole 95 still has a gap, whereby, pressurized and dried air is jetted at high speed from opening 91a formed to be adjacent to the cutting tool 23, thus, it is possible to cool the cutting point on the tip of the cutting tool 23 efficiently and it is possible to remove surely the chips sticking to the cutting point or its circumference with an air flow. Incidentally, a part of pressurized and dried air introduced to case member 86 from gas-supply pipe 96 cools assembly of a vibration body 120 from its outside while passing through the circumference of the assembly of a vibration body 120, to be ejected through the gap of opening H3 to the outside of case member 86.

FIG. 5 (a) and FIG. 5 (b) show respectively a side sectional view and a top sectional view of the tip of tool portion 21 shown in FIG. 1. FIG. 6 is an enlarged side view of cutting tool 23 fixed on the tip of tool portion 21.

As is apparent from the drawing, fixing portion 21a provided on tool portion 21 has a wedge form that is in a square form in a side view, and is in a triangular form in a top view. The cutting tool 23 held by the fixing portion 21a is provided with totally-plate-shaped shank 23b whose tip is in a triangular form in a top view and with processing-chip 23c fixed on the shank 23b. Among them, the shank 23b is a supporting member formed by, for example, cemented carbide or high-speed steel, and it is hardly bent despite its light weight. Further, processing-chip 23c is a chip made of diamond, and it is fixed on the forefront portion of the shank 23b through brazing. The cutting tool 23 itself is embedded in end surface 21d of fixing portion 21a to be fixed, and the tip 23a of the processing-chip 23c is arranged on the extension of tool axis AX. Further, the processing-chip 23c and shank 23b that supports the processing-chip 23c are enclosed in a wedge-shaped space where an open angle formed by extensions of wedge side surfaces (left and right sides) of fixing portion 21a is θ. In this case, open angle θ of the fixing portion 21a is selected from a range of, for example, 20°-90°, and a form of the tip can be changed to a semicircle or the point of a sword suitably adjusting to the aimed form of processing.

The root portion 23e of cutting tool 23, namely of shank 23b is inserted under the condition that it fits in slit-shaped groove 21f having a rectangular cross section provided on XZ plane parallel with tool axis AX from end surface 21d of fixing portion 21a, and it is fixed firmly and on a detachable basis on fixing portion 21a by two fixing screws 25 and 26 formed with the same material as that of tool portion 21. Specifically, the fixing screws 25 and 26 are screwed in successively in fixing holes 21g and 21h which penetrate upper and lower sides of fixing portion 21a for fixing. These fixing holes 21g and 21h extend in the Y axis direction, and the direction of fixing for both screws intersect tool axis AX at right angles. Both fixing holes 21g and 21h are different in terms of an inside diameter, and an inside diameter of the fixing hole 21g is greater than that of the fixing hole 21h. Both fixing holes 21g and 21h are filled with both fixing screws 25 and 26 through screwing engagement. In other words, it is avoided that a deep recessed portion stays or a high protrusion is formed at positions of the fixing hole 21g and the fixing hole 21h. Fixing screw 25 on one hand that is screwed into fixing hole 21h is a connecting member for fixing cutting tool 23, and it is TORX screw including male screw portion 25b and head portion 25a. By screwing the head portion 25a with an appropriate tool under the condition that the male screw portion 25b is inserted into the fixing hole 21g, the male screw portion 25b penetrates opening 23h formed on root portion 23e, and engages with a female screw on an inner surface of fixing hole 21h formed at the back side of the fixing hole 21g. In this case, separation of cutting tool 23 is prevented and fixing of cutting tool 23 is secured, because the root portion 23e of the cutting tool 23 is interposed between head portion 25a and an inner surface of slit-shaped groove 21f to be tightened, and the root portion 23e is fixed from the main surface side. Fixing screw 26 on the other hand to be screwed in the fixing hole 21g is a so-called worm screw which functions as a stopper member that prevents dislocation of the fixing screw 25. The fixing screw 26 engages with a female screw on an inner surface of the fixing hole 21g to be screwed in the fixing hole 21g to fill the inside of the fixing hole 21g, when an upper end of the fixing screw 26 is twisted by an appropriate tool while a lower end of the fixing screw 26 is put on the fixing hole 21g. Owing to the fixing screw 26 thus screwed in, the fixing screw 25 is tightened from its upper end, and looseness of the fixing screw 25 is prevented. In the foregoing, fixing holes 21g and 21h and the fixing screws 25 and 26 serve as a fixing device that fixes cutting tool 23 on tool portion 21.

In the meantime, as shown in FIG. 6, processing-chip 23a of cutting tool 23 is R-cutting-tool wherein cutting face S1 on its tip has an angle of opening of about 30° (see FIG. 5 (b)), for example, and its tip is formed to be a form of a circular arc. The cutting face S1 in this case means a surface of cutting tool 23 that contributes to cutting of materials to be subjected to cutting processing. A normal line of the cutting face S1 is in parallel with a longitudinal bending vibration plane that is in parallel with YZ plane of cutting tool 23, which makes it possible to conduct vibration cutting accurately employing longitudinal bending vibration without waste. Further, a radius of a circular arc on the tip of the cutting face S1 of a cutting edge provided on the tip of the processing-chip 23a is about 0.8 mm, for example, and clearance angle γ of clearance surface S2 is, for example, about 5°. In this case, the clearance angle γ is an angle formed by a tangential line at a cutting-in point on the clearance surface S2 or on its extension line and a tangential line of a processed plane at a cutting point.

Each of FIGS. 7-11 is a diagram illustrating a variation of assembly of a vibration body 120 shown in FIG. 2. FIG. 7 (a), FIG. 7 (b) and FIG. 7 (c) represent respectively an end view, a top view and a side view, all for assembly of a vibration body 220 that is the first variation. In the assembly of a vibration body 220, a lateral cross section perpendicular to Z axis of second portion P2 representing the root side of vibration body for cutting 282, is a circle, and each of lateral cross sections perpendicular to Z axis of axial direction oscillator 283 and counterbalance 285 is a circle corresponding to the foregoing. Further, bending oscillator 84 is bonded on the curved side of the second portion P2. The vibration body for cutting 282, the axial direction oscillator 283 and the counterbalance 285 are respectively the same as the vibration body for cutting 82, the axial direction oscillator 83 and the counterbalance 85 of the assembly of a vibration body 120 shown in FIG. 2 in terms of structures and functions, although they are different in terms of a shape, and detailed explanations will be omitted here.

Also in the assembly of a vibration body 220, the first width in the lateral direction (X axis direction) is greater than the second width in the longitudinal direction (Y axis direction) in the cross sectional form perpendicular to Z axis of the first portion P1 from holding members 82b and 82c to the tip side. Therefore, the rigidity of vibration body main part 282a in the X axis direction can be enhanced, and lateral bending vibrations on fixing portion 21a can be restrained. Consequently, an object can be processed highly accurately by the assembly of a vibration body 220 that is controlled with a high precision.

The vibration direction established on axial direction oscillator 283 is a Z axis direction that is substantially the same as the direction of axial vibration of vibration body main part 282*a*. In the specific example, the assembly of a vibration body 220 is made so that an error of mounting angle for both members 282*a* and 283 may be within 5 minutes, and bending vibration caused by axial direction oscillator 283 is hardly generated in the vibration body main part 282*a*.

Further, the bending vibration direction established by a pair of bending oscillators 84 and 84 is substantially the same as the direction of longitudinal bending vibration of the vibration body main part 282*a* on YZ plane. In the specific example, the assembly of a vibration body 220 is made so that an error of mounting angle for both members 282*a* and 84 may be within 5 minutes, and also in the vibration body main part 282*a*, lateral bending vibration caused by bending oscillator 84 is hardly generated.

FIG. 8 (*a*), FIG. 8 (*b*) and FIG. 8 (*c*) represent respectively an end view, a top view and a side view showing assembly of vibration body 320 of the second variation. In the assembly of a vibration body 320, each of lateral cross sections perpendicular to Z axis of the first and the second portions P1 and P2 is an oval form and each of lateral cross sections perpendicular to Z axis of axial direction oscillator 383 and counterbalance 385 is an oval form. Further, bending oscillator 84 is bonded on the curved side surface of the second portion P2. The vibration body for cutting 382, the axial direction oscillator 383 and the counterbalance 385 are respectively the same as the vibration body for cutting 82, the axial direction oscillator 83 and the counterbalance 85 of the assembly of a vibration body 120 shown in FIG. 2 in terms of structures and functions, although they are different in terms of a shape, and detailed explanations will be omitted here.

Also in the assembly of a vibration body 320, the first width in the lateral direction (X axis direction) is greater than the second width in the longitudinal direction (Y axis direction) in the cross sectional form perpendicular to Z axis of the first portion P1 from holding members 82*b* and 82*c* to the tip side. Therefore, the rigidity of vibration body main part 382*a* in the X axis direction can be enhanced, and lateral bending vibrations on fixing portion 21*a* can be restrained. Consequently, an object can be processed highly accurately by the assembly of a vibration body 320 that is controlled with a high precision.

The vibration direction established on axial direction oscillator 383 is a Z axis direction that is substantially the same as the direction of axial vibration of vibration body main part 382*a*. In the specific example, the assembly of a vibration body 320 is made so that an error of mounting angle for both members 382*a* and 383 may be within 5 minutes, and bending vibration caused by axial direction oscillator 383 is hardly generated in the vibration body main part 382*a*.

Further, the bending vibration direction established by a pair of bending oscillators 84 and 84 is substantially the same as the direction of longitudinal bending vibration of the vibration body main part 382*a* on YZ plane. In the specific example, the assembly of a vibration body 320 is made so that an error of mounting angle for both members 382*a* and 84 may be within 5 minutes, and also in the vibration body main part 382*a*, lateral bending vibration caused by bending oscillator 84 is hardly generated.

FIG. 9 (*a*), FIG. 9 (*b*) and FIG. 9 (*c*) represent respectively an end view, a top view and a side view showing assembly of vibration body 420 of the third variation. In the assembly of a vibration body 420, each of lateral cross sections perpendicular to Z axis of the first and the second portions P1 and P2 of the vibration body for cutting 482 is rectangular, and each of lateral cross sections perpendicular to Z axes of axial direction oscillator 483 and counterbalance 485 is also rectangular corresponding to this. In this case, the first portion P1 of the vibration body for cutting 482 has a tapered outer form, and bending oscillator 84 is bonded on the facing surface on the broader side of the second portion P2. The vibration body for cutting 482, the axial direction oscillator 483 and the counterbalance 485 are respectively the same as the vibration body for cutting 82, the axial direction oscillator 83 and the counterbalance 85 of the assembly of a vibration body 120 shown in FIG. 2 in terms of structures and functions, although they are different in terms of a shape, and detailed explanations will be omitted here.

In the foregoing, it is possible to transmit a vibration having less noise from the first portion P1 to fixing portion 21*a* with less loss because the first portion P1 of vibration body for cutting 482 is made to be in a tapered form wherein the first portion tapers off smoothly, and thereby the fixing portion 21*a* is easily caused to vibrate under the desired condition.

In the assembly of a vibration body 420 again, the first width in the lateral direction (X axis direction) is greater than the second width in the longitudinal direction (Y axis direction) in the cross sectional form perpendicular to Z axis of the first portion P1 from holding members 82*b* and 82*c* to the tip side. Therefore, the rigidity of vibration body main part 482*a* in the X axis direction can be enhanced, and lateral bending vibrations on fixing portion 21*a* can be restrained. Consequently, an object can be processed highly accurately by the assembly of a vibration body 420 that is controlled with a high precision.

The vibration direction established on axial direction oscillator 483 is a Z axis direction that is substantially the same as the direction of axial vibration of vibration body main part 482*a*. In the specific example, the assembly of a vibration body 420 is made so that an error of mounting angle for both members 482*a* and 483 may be within 5 minutes, and bending vibration caused by axial direction oscillator 483 is hardly generated in the vibration body main part 482*a*.

Further, the bending vibration direction established by a pair of bending oscillators 84 and 84 is substantially the same as the direction of longitudinal bending vibration of the vibration body main part 482*a* on YZ plane. In the specific example, the assembly of a vibration body 420 is made so that an error of mounting angle for both members 482*a* and 84 may be within 5 minutes, and also in the vibration body main part 482*a*, lateral bending vibration caused by bending oscillator 84 is hardly generated.

FIG. 10 (*a*), FIG. 10 (*b*) and FIG. 10 (*c*) represent respectively an end view, a top view and a side view showing assembly of vibration body 520 of the fourth variation. In the assembly of a vibration body 520, each of lateral cross sections perpendicular to Z axis of the first and the second portions P1 and P2 of the vibration body for cutting 582 is rectangular, and each of lateral cross sections perpendicular to Z axis of axial direction oscillator 583 and counterbalance 585 is also rectangular. In this case, the first portion P1 of the vibration body for cutting 582 has a tapered outer form that is tapered and swells out with respect to ±X directions, and bending oscillators 84 are bonded on the facing surfaces on the broader sides of the second portion P2. The vibration body for cutting 582, the axial direction oscillator 583 and the counterbalance 585 are respectively the same as the vibration body for cutting 82, the axial direction oscillator 83 and the counterbalance 85 of the assembly of a vibration body 120 shown in FIG. 2 in terms of structures and functions, although they are different in terms of a shape, and detailed explanations will be omitted here.

In the foregoing, it is possible to transmit a vibration having less noise from the first portion P1 to fixing portion 21a with less loss because the first portion P1 of vibration body for cutting 482 is made to be in a tapered form wherein the first portion tapers off smoothly, and thereby the fixing portion 21a is easily caused to vibrate under the desired condition. Further, it is possible to enhance rigidity of the first portion P1 with respect to ±X directions because the first portion P1 is swelled out with respect to ±X directions, and thereby, a difference of the state of vibration of the first portion P1 between ±X directions and ±Y directions can further be made greater.

Also in the assembly of a vibration body 520, the first width in the lateral direction (X axis direction) is greater than the second width in the longitudinal direction (Y axis direction) in the cross sectional form perpendicular to Z axis of the first portion P1 from holding members 82b and 82c to the tip side. Therefore, the rigidity of vibration body main part 582a in the X axis direction can be enhanced, and lateral bending vibrations on fixing portion 21a can be restrained. Consequently, an object can be processed highly accurately by the assembly of a vibration body 520 that is controlled with a high precision.

The vibration direction established on axial direction oscillator 583 is a Z axis direction that is substantially the same as the direction of axial vibration of vibration body main part 582a. In the specific example, the assembly of a vibration body 520 is made so that an error of mounting angle for both members 582a and 583 may be within 5 minutes, and bending vibration caused by axial direction oscillator 583 is hardly generated in the vibration body main part 582a.

Further, the bending vibration direction established by a pair of bending oscillators 84 and 84 is substantially the same as the direction of longitudinal bending vibration of the vibration body main part 582a on YZ plane. In the specific example, the assembly of a vibration body 520 is made so that an error of mounting angle for both members 582a and 84 may be within 5 minutes, and also in the vibration body main part 582a, lateral bending vibration caused by bending oscillator 84 is hardly generated.

FIG. 11 (a), FIG. 11 (b) and FIG. 11 (c) represent respectively an end view, a top view and a side view showing assembly of vibration body 620 of the fifth variation. In the assembly of a vibration body 620, each of lateral cross sections perpendicular to Z axis of the first and the second portions P1 and P2 of the vibration body for cutting 682 is rectangular, and each of lateral cross sections perpendicular to Z axis of axial direction oscillator 683 and counterbalance 685 is also rectangular. In this case, the first portion P1 of the vibration body for cutting 682 has a tapered outer form that is tapered and becomes depressed inside with respect to ±Y directions, and bending oscillators 84 are bonded on the facing surfaces on the broader sides of the second portion P2. The vibration body for cutting 682, the axial direction oscillator 683 and the counterbalance 685 are respectively the same as the vibration body for cutting 82, the axial direction oscillator 83 and the counterbalance 85 of the assembly of a vibration body 120 shown in FIG. 2 in terms of structures and functions, although they are different in terms of a shape, and detailed explanations will be omitted here.

In the foregoing, it is possible to transmit a vibration having less noise from the first portion P1 to fixing portion 21a with less loss because the first portion P1 of vibration body for cutting 482 is made to be in a tapered form wherein the first portion tapers off smoothly, and thereby the fixing portion 21a is easily caused to vibrate under the desired condition. Further, it is possible to make a difference of the state of vibration of the first portion P1 between ±X directions and ±Y directions to be greater, because the first portion P1 is depressed inside with respect to ±Y directions.

Also in the assembly of a vibration body 620, the first width in the lateral direction (X axis direction) is greater than the second width in the longitudinal direction (Y axis direction) in the cross sectional form perpendicular to Z axis of the first portion P1 from holding members 82b and 82c to the tip side. Therefore, the rigidity of vibration body main part 682a in the X axis direction can be enhanced, and lateral bending vibrations on fixing portion 21a can be restrained. Consequently, an object can be processed highly accurately by the assembly of a vibration body 620 that is controlled with a high precision.

The vibration direction established on axial direction oscillator 683 is a Z axis direction that is substantially the same as the direction of axial vibration of vibration body main part 682a. In the specific example, the assembly of a vibration body 520 is made so that an error of mounting angle for both members 682a and 683 may be within 5 minutes, and bending vibration caused by axial direction oscillator 683 is hardly generated in the vibration body main part 682a.

Further, the bending vibration direction established by a pair of bending oscillators 84 and 84 is substantially the same as the direction of longitudinal bending vibration of the vibration body main part 682a on YZ plane. In the specific example, the assembly of a vibration body 620 is made so that an error of mounting angle for both members 682a and 84 may be within 5 minutes, and also in the vibration body main part 682a, lateral bending vibration caused by bending oscillator 84 is hardly generated.

Second Embodiment

A processing device relating to the Second Embodiment of the invention will be explained as follows, referring to the drawings. FIG. 12 is a block diagram illustrating conceptually the structure of a processing device of a vibration cutting type that processes an optical surface of a molding die for forming an optical element such as a lens.

As shown in FIG. 12, processing device 10 is equipped with vibration cutting unit 20 for processing work W representing an object to be processed by cutting, NC drive mechanism 30 representing a driving device that supports the vibration cutting unit 20 for work W, drive control device 40 that controls operations of the NC drive mechanism 30, oscillator driving device 50 that gives desired vibration to the vibration cutting unit 20, gas supply device 60 that supplies cooling gas to the vibration cutting unit 20 and main control device 70 that controls operations of the total device collectively.

The vibration cutting unit 20 is a vibration cutting tool wherein cutting tool 23 is embedded in the tip of tool portion 21 extending in the Z direction, and it cuts the work W efficiently with high frequency vibration of this cutting tool 23. The vibration cutting unit 20 has the structure explained in the First Embodiment.

The NC drive mechanism 30 is a driving device having the structure wherein the first stage 32 and the second stage 33 are placed on base 31. In this case, the first stage 32 supports the first movable portion 35, and the first movable portion 35 supports indirectly the work W through chuck 37. The first stage 32 can move the work W to the desired position in the Z axis direction, for example, at the desired speed. The first movable portion 35 can rotate the work W at the desired speed around horizontal rotating axis RA that is in parallel with Z axis. On the other hand, the second stage 33 supports the second movable portion 36 which supports vibration cutting unit 20. The second stage 33 supports the second movable portion 36 and vibration cutting unit 20, and it can move these to desired positions in the X axis direction and Y axis direction at desired speed. In this case, the second movable portion 36 can also rotate the vibration cutting unit 20 by a desired amount of angle around vertical revolving axis PX parallel with Y axis at the desired speed, in case of need.

Meantime, in the aforesaid NC drive mechanism 30, the first stage 32 and the first movable portion 35 constitute a driving section for an object to be processed that drives the work W, while, the second stage 33 and the second movable portion 36 constitute a tool driving section that drives the vibration cutting unit 20.

The drive control device 40 is one that makes the highly precise numerical control possible, and it causes the first and second stages 32 and 33 and the first and second movable portions 35 and 36 to operate to the aimed state, by driving a motor and a position sensor built in the NC drive mechanism 30 under the control of the main control device 70. For example, the work W can be rotated at high speed around horizontal rotating axis RA by the first movable portion 35, while the processing point on the tip of cutting tool 23 provided at the tip of tool portion 21 of vibration cutting unit 20 is moved (feeding operation) at low speed relatively to the work W by the first and second stages 32 and 33, following the prescribed locus established on the surface parallel with XZ plane. Consequently, the NC drive mechanism 30 can be utilized as a high-accuracy lathe under the control of the drive control device 40.

The oscillator driving device 50 is one for supplying electric power to the vibration source built in the vibration cutting unit 20, and it can vibrate the tip of tool portion 21 at desired frequency and amplitude with built-in oscillation circuit and PLL circuit under the control of the main control device 70. Incidentally, the tip of tool portion 21 can vibrate on a basis of bending vibration perpendicular to the axis (namely, tool axis AX extending in the direction of a depth of cut-in) and on a basis of axial vibration parallel with the axis, and its two-dimensional vibration and three-dimensional vibration make it possible to conduct microscopic and efficient processing wherein a tip of tool portion 21, namely, cutting tool 23 faces a surface of work W.

The gas supply device 60 is one for cooling vibration cutting unit 20, and it is equipped with gaseous fluid source 61 that supplies pressurized and dried air, temperature regulating section 63 representing a temperature regulating device that regulates its temperature when pressurized and dried air coming from the gaseous fluid source 61 passes through it and with flow regulating section 65 representing a flow regulating device that regulates a flow of pressurized and dried air that has passed through the temperature regulating section 63. The gaseous fluid source 61 feeds air into a drying machine that employs, for example, a thermal process and a desiccator, to dry air and a compressor boosts dried air to the desired air pressure. Although an illustration will be omitted, the temperature regulating section 63 can have a flow path through which the coolant is circulated to the circumference, for example, and a temperature sensor provided on the half way of this flow path, and it can regulates pressurized and dried air which has passed through the flow path to the desired temperature by adjusting a temperature and supply quantity. Further, the flow regulating section 65 has a valve and a flow controller (not shown), for example, and it can regulate the flow in the case of supplying temperature-adjusted pressurized and dried air to vibration cutting unit 20.

Each of FIGS. 13 (a) and 13 (b) is an enlarged top view illustrating how the work W is processed by using processing device 10 shown in FIG. 12. Fixing portion 21a of tool portion 21 vibrates at high speed in YZ plane, for example, as explained earlier. Further, fixing portion 21a of tool portion 21 is moved gradually by NC drive mechanism 30 in FIG. 12, while drawing the prescribed locus in XZ plane, for example, for the work W representing an object to be processed. In a word, a feeding operation for the tool portion 21 is conducted. The work W representing an object to be processed is rotated around rotating axis RA parallel with Z axis at constant speed by NC drive mechanism 30 shown in FIG. 12. Owing to this, turning processing for the work W is made possible, and surface to be processed SA (for example, a stepwise surface such as a phase element surface, in addition to curved surface such as a concave spherical surface, a convex spherical surface or an aspheric surface) which is rotation-symmetric about the rotating axis RA for the work W can be formed.

In this case, if tool axis AX of tool portion 21 fixed on the second stage 33 is maintained to be parallel with Z axis direction, a vibration surface of a tip of cutting tool 23 (elliptical orbit EO) results in the state where the vibration surface is inclined by the so-called a facing angle for the surface SA to be formed on the work W, and forces in ±X directions are applied to fixing portion 21a of tool portion 21. In this case, rigidity in the X axis direction of the tool portion 21, namely, each of assemblies of vibration body 120-620 constituting the vibration cutting unit 20 is enhanced. Therefore, positions of fixing portion 21a of tool portion 21 and of cutting tool 23 can be controlled with high precision, and the work W representing an object can be processed with high precision. Further, lateral bending vibration in the X axis direction of the tool portion 21, namely, each of assemblies of vibration body 120-620 constituting the vibration cutting unit 20 is hardly generated, the state of vibration on the tip of cutting tool 23 can be controlled precisely, and work W representing an object can be processed with high precision.

Since pressurized and dried air is jetted at high speed from opening 95a on the tip of tool portion 21 toward the forefront of cutting tool 23 in the course of processing of the work W, it is possible to cool cutting tool 23 and surface to be processed SA efficiently, and to cause temperatures of the cutting tool 23 and the surface to be processed SA to be within a certain range by adjusting the temperature and the rate of flow of pressurized and dried air. Since this pressurized and dried air is introduced via through hole 95 that penetrates the axis center of tool portion 21, and flows through the inside of vibration body for cutting 82, axial direction oscillator 83 and counterbalance 85, temperatures of vibration body for cutting 82 and others can be regulated by adjusting the temperature and the rate of flow of pressurized and dried air. By regulating the temperature of the pressurized and dried air in the aforesaid way, the temperature of the vibration body for cutting 82 can be stabilized, and a highly accurate cutting-processed surface having high reproducibility can be obtained.

Third Embodiment

A molding die relating to the Third Embodiment will be explained as follows. FIG. 14 is a diagram illustrating a molding die (molding die for optical element) made by using vibration cutting unit 20 of the First Embodiment, and FIG. 14 (a) is a side cross sectional view of a fixed die, namely, first die 2A, while, FIG. 14 (b) is a side cross sectional view of a movable die, namely, second die 2B. Optical surfaces 3a and 3b respectively of both dies 2A and 2B are those subjected to finish processing conducted by processing device 10 shown in FIG. 12. In other words, base material (material is cemented carbide for example) for both dies 2A and 2B is fixed on chuck 37 as work W, and cutting tool 23 is vibrated at high speed while forming a standing wave on vibration cutting unit 20 by operating oscillator driving device 50. Simultaneously with this, drive control device 40 is operated suitably to move the tip of tool portion 21 of vibration cutting unit 20 optionally for work W on a three-dimensional basis. Owing to this, transfer optical surfaces 3a and 3b of dies 2A and 2B can be made to be a stepped surface, a phase structure surface and a diffraction structure surface in addition to a spherical surface and an aspheric surface.

FIG. 15 is a sectional view of lens L representing an optical element that is press-molded by using die 2A shown in FIG. 14 (a) and die 2B shown in FIG. 14 (b). When optical surfaces 3a and 3b of dies 2A and 2B have a stepped surface, a phase structure surface and a diffraction structure surface, a formed optical surface of the lens L also has a stepped surface, a phase structure surface and a diffraction structure, respectively which are not illustrated. Further, a material of lens L may be glass or the like without being limited to plastic. In the meantime, lens L can be made directly by processing device 10 in the Second Embodiment.

Example 1

A specific processing example employing vibration cutting unit 20 and processing device 10 of the aforesaid embodiment and a comparative example will be explained as follows.

In the specific example, a thickness in the lateral bending vibration direction parallel with X direction of vibration body for cutting 82, namely, the first width was made to be 35 mm and a thickness in the longitudinal bending vibration direction parallel with Y direction of vibration body for cutting 82, namely, the second width was made to be 25 mm. In other words, dimensions of a cross section of vibration body for cutting 82 were made to be 25 mm in the longitudinal direction×35 mm in the lateral direction, and dimensions of a cross section of the second portion P2 were made to be 15 mm in the longitudinal direction×20 mm in the lateral direction, and vibration cutting processing was conducted by using vibration cutting unit 20 wherein rigidity in the lateral bending vibration direction was improved.

For the aforesaid vibration cutting processing, a super-precision processing machine having a movable stage with 3 axes intersecting at right angles each other as shown in FIG. 16 was used. As is illustrated, processing device 110 is equipped with vibration cutting unit 20 for conducting cutting processing on work W representing an object to be processed and NC drive mechanism 130 that supports vibration cutting unit 20 for work W. Incidentally, illustrations for drive control device 40, oscillator driving device 50, gas supply device and main control device 70 all explained in the Second Embodiment shown in FIG. 12 will be omitted. The NC drive mechanism 130 is a driving device with a structure in which the first stage 132 and the second stage 133 are placed on base 131 representing a level block. In this case, the first stage 132 supports Y stage 136, and this Y stage 136 supports vibration cutting unit 20 vertically through an arm block, namely, unit mounting portion 135. The first stage 132 and the Y stage 136 can move the tip of the vibration cutting unit 20 to the desired position in the X axis direction or the Y axis direction, for example, at the desired speed. On the other hand, the second stage 133 supports the work W through an unillustrated chuck. The second stage 133 can move the work W to the desired position in the Z axis direction, for example, at the desired speed.

In the vibration cutting unit 20, processing chip 23a of cutting tool used for cutting, namely, a diamond tool is an R-cutting-tool wherein an angle of opening of cutting face S1 on the tip is 60° and the tip is formed to be in a circular arc form. A radius of the circular arc on the tip on cutting face S1 of a cutting edge is 0.8 mm, clearance angle γ is 10° and an angle formed by cutting face S1 at a point of cut is 15°. An amount of cut by the processing chip 23a in this case is 2 μm. In the present vibration cutting, the cutting tool 23 vibrates in each of both the axis direction and the bending direction, while, the cutting edge of the processing chip 23a conducts circular motion or elliptic motion. Consequently, cutting is done in a way to scoop up with cutting face S1, and thereby, it is possible to make an amount of cut to be several times as large as that in an ordinary processing which is not vibration cutting, even in the case of ductile mode cutting.

As a material of work W representing an object to be processed, Micro-Alloy F (hardness HV=1850) made by Tungaloy Corporation was used. With respect to a processed form of an optical surface, its cross sectional form is in an aspheric surface form, while, in the direction intersecting the aforesaid cross sectional form, the processed form is a cylindrical aspheric surface form having no curvature (a cross sectional form in the direction perpendicular to the axis parallel with a base line has approximation R concave of 3.2 mm, a central radius of curvature of 5.4 mm and a width of 4 mm, and a form in the axial direction parallel with a base line has a radius of curvature of ∞ (infinity) and a length of 15 mm).

As a result of the vibration cutting processing conducted in the method of the aforesaid example, it was possible to obtain an optical surface having a form error of about 0.12 μmPV through a single processing. By conducting further the form error correcting processing on the aforesaid processed surface, it was possible to attain the form accuracy of 0.047 μmPV which is a required accuracy (see FIG. 17). Incidentally, in FIG. 17, the axis of abscissa shows a distance from the center of the processed surface, and the axis of ordinate shows a form error.

When the processed surface subjected to the aforesaid form error correction processing was observed under a microscope, there were observed tool marks which usually appear when giving a normal depth of cut, and it was confirmed that cutting under the ductile mode was advanced. Surface roughness of this processed surface was measured by surface roughness measuring instrument HD 3300 made by WYKO Co. to prove to be 3.55 nmRa, and a transfer optical surface capable of being used as a die was obtained.

Further, as another example, vibration cutting processing was conducted by using vibration cutting unit 20 wherein a thickness in the lateral bending vibration direction of vibration body for cutting 82, namely, the first width was made to be extremely thick to 200 mm, cross sectional dimensions of the vibration body for cutting 82 were made to be 25 mm in the longitudinal direction and 200 mm in the lateral direction, and rigidity in the lateral bending vibration direction was improved.

After conducting the optical surface processing which is the same as that of the aforesaid vibration cutting unit 20 with longitudinal direction width 25 mm and lateral direction width 35 mm, an excellent optical surface having a form error of about 0.08 μmPV was obtained through a single cycle of processing. Further, by conducting the form error correction processing for the processed surface obtained by the aforesaid processing, it was possible to attain the form accuracy of 0.040 µmPV. Further, when surface roughness of the processed surface subjected to the form error correction processing was measured by the aforesaid measuring instrument HD 3300, the surface roughness proved to be 2.90 nmRa, which showed that the surface roughness was improved more than in the example described above.

A comparative example will be explained as follows. In vibration cutting unit 20 which has been used, a cross sectional form of the second portion P2 on vibration body for cutting 82 is in a form of a circle whose diameter is 25 mm, and it has a cone from positions of holding members 82b and 82c being tapered toward the tip of the vibration body for cutting 82 gradually to the position where a diameter is 15 mm, and in first portion P1 beyond the position, a circular cross section whose diameter is 15 mm continues up to the tip. Other conditions were made to be the same as those in the example.

Vibration cutting processing for a cylindrical aspheric surface form was conducted by the use of vibration cutting unit 20 of the comparative example. The results of the vibration cutting processing conducted showed that a form accuracy at the position that is away from the center of the processed surface, namely, at the position where a facing angle of the tip of processing chip 23c grows greater, was as low as 10 µmPV, on the optical surface of the die made by processing the work W, and the die cannot be used as a die for forming an optical surface (see FIG. 18). Further, the portion where a form accuracy was low was observed under a microscope, and the results of the observation showed that tool marks to be observed in the case of normal cutting were not observed, and the processed surface looked sandy and rough.

When considering the aforesaid results, surface roughness and a form of the optical surface processed in the position where a facing angle at the tip of processing chip 23c was smaller were excellent on the optical surfaces of a die obtained in the comparative example, therefore, in the vibration cutting unit 20 in the comparative example, it is considered that the cutting edge of the processing chip 23c was pushed back in the lateral direction (direction perpendicular to the longitudinal vibration plane) by a processing component force, and established depth of cut was not realized, because rigidity in the lateral bending vibration direction was insufficient, though rigidity in the axial vibration direction and rigidity in the longitudinal bending vibration direction were sufficient. Further, after the processing chip 23c was observed under a microscope, it was found that a cutting edge portion which cut the portion where form accuracy was poor was worn out greatly, thus, processing chip 23c did not cut in at the processing point and was rubbed against the processed surface.

To summarize the foregoing, it is considered that a depth of cut was able to be given surely in the vibration cutting, by increasing a thickness in the lateral bending vibration direction of vibration body for cutting 82 and by enhancing rigidity in the aforesaid direction, as in the vibration cutting unit 20 of the example, and the effect of the invention was proved. However, if the thickness in the lateral bending vibration direction is increased too much, work W interferes with fixing portion 21a or with tool portion 21 in the case of processing, although this depends on a facing angle of an optical surface of the work W representing an object to be processed. Therefore, it is desirable to make the vibration body for cutting 82 within a range of the form prescribed by the present invention.

Example 2

In the present example, vibration body for cutting 482 in a tapered form in which the vibration body is tapered off gradually while keeping the width in the X direction, namely, in the lateral bending vibration direction to be greater than the width in the longitudinal bending vibration direction, in the portion covering from bending oscillator 84 to the vicinity of fixing portion 21a on the tip of vibration body for cutting 482, for the purpose of improving rigidity of a conventional vibration body for cutting whose tip portion and its neighborhood are of constant thickness (see FIG. 9 for the specific form). Owing to this, it was possible, on the vibration body for cutting 482 of the example, to further improve rigidity of the vibration body for cutting 482 of the aforesaid First Example even in the portion near the bending oscillator 84.

Now, conventional vibration body for cutting 82 will be explained for the purpose of comparison (see FIG. 1 that is close to the conventional vibration body for cutting in terms of a form, for convenience sake). In the vibration cutting, a vibration generated by bending oscillator 84 or the like is transmitted to vibration body for cutting 82, and resonance of the vibration body for cutting 82 generated by the foregoing is used to vibrate fixing portion 21a and further a tip of cutting tool 23. The frequency of bending vibration in this case is lower when the vibrating medium is thinner, and it is higher when the vibrating medium is thicker. Further, when a vibrating medium is thinner, an amplitude of its vibration is greater. Therefore, in the conventional vibration body for cutting 82, a tip portion of the vibration body for cutting 82 where cutting tool 23 is mounted is thinner than the vicinity of the bending oscillator 84, and its form is tapered off stepwise at an intermediate portion of the vibration body for cutting 82, in many cases. A thin portion where a thickness is fixed both in the longitudinal direction and the lateral direction continues from a portion that is tapered stepwise to fixing portion 21a on the tip side, because a form of rotational symmetry, in particular, is easily made with a lathe or the like. In many of these embodiments, rigidity of the vibration body for cutting 82 against bending is substantially the same for the longitudinal direction and the lateral direction, in the thin portion from the steps to the fixing portion 21a, and no action for improving rigidity on one side is taken.

For the purpose of improving accuracy of the apparatus of a convention type, the optical surface was processed by using the vibration body for cutting 482 of the aforesaid example, namely, vibration cutting unit 420. A form to be processed was a cylindrical aspheric surface identical to that in the first example. As a material for work W representing an object to be processed, Micro-Alloy F (hardness HV=1850) made by Tungaloy Corporation was used. After the cutting processing, surface roughness measuring instrument HD 3300 made by WYKO Co. was used to measure the surface roughness of this processed surface. Results of the measurement showed that an average surface roughness was 2.9 nmRa, and an excellent optical mirror finished surface was obtained. Further, a processed form error was measured by three-dimensional form measuring instrument UA3P made by Matsushita Electric Industrial Co. Ltd., and it was about 0.11 µmPV after the first processing. After conducting correction processing by preparing a processing program to correct the aforesaid form error, an excellent result with a form error of 0.48 µmPV was obtained.

On the other hand, the same processing was tried by the use of the conventional vibration body for cutting. However, a position of the cutting edge was varied by insufficient rigidity in the lateral bending vibration direction, and an accuracy of a form of the processed surface was as poor as 5.2 μmPV.

Incidentally, another vibration body for cutting 482 wherein the vibration body for cutting 482 of the aforesaid example was changed in terms of a form was also prepared. In the case of the processing of an optical surface having a large facing angle, the facing angle, for example, grows to be close to 70° in the periphery of the processed surface. In that case, there is a risk of causing cases where a cutting tool or the vicinity of a fixing portion for the cutting tool interferes with the processed surface. In the present variation, therefore, a tip portion of the vibration body for cutting 482 is processed to be wedge-shaped in the top view so that a tip angle on the fixing portion 21*a* provided on the tip of the vibration body for cutting 482 may be 60° for the portion from the root side of the tool fixing portion toward its tip, to avoid interference of the vicinity of the tool fixing portion. After vibration tests, when comparing with an oscillator that is not subjected to the aforesaid processing of the tip, a phase of the longitudinal bending vibration was different from that of the axial vibration by about 1.3° because of the change in a weight of the tip of the vibration body for cutting 482. However, it was possible to correct the phase difference by conducting phase adjustment.

An optical surface was processed by using this vibration body for cutting 482. Processing chip 23*a*, namely, a diamond tool used for cutting is an R-cutting-tool wherein cutting face S1 on its tip has an angle of opening of 60°, and its tip is formed to be a form of a circular arc. A radius of the circular arc on the tip of the cutting face S1 of a cutting edge is 0.8 mm, clearance angle γ is 10°, and an angle formed by the cutting face S1 at a cutting point is −35°. An amount of a depth of cut by the processing chip 23*a* in this case is 2 μm. After the cutting processing, surface roughness of the optical surface was measured by surface roughness measuring instrument HD 3300 made by WYKO Co. In the results of the measurement, the surface roughness on the processed surface was 3.0 nmRa, and an optical mirror surface capable sufficiently of being put to practical use was obtained. Accuracy of the form of the processed surface was measured by three-dimensional form measuring instrument UA3P made by Matsushita Electric Industrial Co. Ltd. to prove its error of processed form of about 0.11 μmPV after the first processing. After conducting correction processing by preparing a processing program to correct the aforesaid form error, a result of a form error of 0.045 μmPV was obtained.

Example 3

Vibration energy is usually lost greatly at the location where stress is concentrated in the vibration for cutting, and most of energies are converted into heat. When the loss is great, an amplitude based on the design cannot be obtained, a resonance frequency is changed by the expansion of a vibration body caused by the generated heat, overload by heat is applied on a piezoelectric element representing a vibration body, and the piezoelectric element is sometimes deteriorated. Therefore, with respect to vibration bodies for cutting 82 and 282 each having a sharp edge, when each of the vibration bodies for cutting 82 and 282 is made by a material that hardly vibrates, that is, made by a material in which a loss of vibration energy is great, occasions where expected vibration is not obtained were generated with high frequency.

In the present example, therefore, vibration body for cutting 382 whose cross sectional view is in an elliptic form (see FIG. 8 for the specific form) was prepared. Owing to this vibration body for cutting 382 having an elliptic cross sectional view, a thickness in the lateral bending vibration direction was made to be greater than that in the longitudinal bending vibration direction, and a sharp edge where the stress is concentrated was eliminated while maintaining rigidity in the lateral bending vibration direction, thereby, a loss of vibration energy was reduced.

A vibration body for cutting for the comparative example whose cross sectional form is rectangular and whose cross sectional dimensions are 20 mm in the longitudinal direction and 40 mm in the lateral direction was prepared by using a material of SUS304 whose Young's modulus is smaller than that of high speed steel that is used for the conventional vibration body for cutting, and the state of vibration was examined. In the examination, heat was generated by the loss of vibration energy mentioned above, a resonance frequency was changed and was not stabilized. However, when vibration body for cutting 382 with an elliptic cross sectional form having the same ratio of minor axis 20 mm×major axis 40 mm was made by using the same SUS304, and its state of vibration was examined, heat generation caused by vibration was less than ordinary 2° C. and fluctuation of resonance frequency was about 5% within design specifications.

Further, a vibration body for cutting having a form obtained by cutting a cylinder with a diameter of 40 mm in parallel with the cylinder center axis to have a 20 mm width, namely, a vibration body for cutting whose cross section is in a form of an ellipse formed by two circular arcs and two straight lines was made, that is, an intermediate form between a rectangular form and an elliptical form, and vibration tests were conducted. As a result, the fluctuation of the resonance frequency was within a range of design specification of 5% which is the same as the aforesaid example, although heat generation caused by vibration was about 3.5° C. which is slightly higher than the ordinary heat generation.

An optical surface was subjected to super-precision processing by the use of vibration body for cutting 382 whose cross section is in an elliptical form. The processed form was a cylindrical aspheric surface form, which is the same as the aforementioned Third Embodiment. As a material of work W representing an object to be processed, Micro-Alloy F (hardness HV=1850) made by Tungaloy Corporation was used.

After the processing, surface roughness of the optical surface was measured by using surface roughness measuring instrument HD 3300 made by WYKO Co. As a result, an average surface roughness was 2.5 nmRa, and an excellent optical mirror finished surface was obtained. Further, a processed form accuracy was measured by three-dimensional form measuring instrument UA3P made by Matsushita Electric Industrial Co. Ltd., and it was about 0.10 μmPV after the first processing. After conducting correction processing by preparing a processing program to correct the aforesaid form error, an excellent result with a form error of 0.45 μmPV was obtained.

Incidentally, though it is not easy to make vibration body for cutting 382 having an elliptical cross section by using a general-purpose milling machine and a general-purpose lathe, it is easy to make it by using a machining center or the like, that has functions higher than those of the aforesaid machine tools.

Example 4

In the present example, rigidity of a conventional vibration body for cutting is improved by providing a difference between longitudinal bending vibration and lateral bending vibration. A thickness in the longitudinal bending vibration direction was made to be 25 mm and a thickness in the lateral bending vibration direction was made to be 40 mm. Since the resonance frequency is generally low when a cross sectional form is thin, and it is high when a cross sectional form is thick, the vibration body for cutting 82 wherein a thickness in the longitudinal bending vibration direction was made to be 25 mm and a thickness in the lateral bending vibration direction was made to be 40 mm as an example.

In this case, a position of vibration node for the lateral bending vibration among three vibration types of axial vibration, longitudinal bending vibration and lateral bending vibration of the vibration body for cutting 82 was shifted greatly from that of the other two types of vibrations. In other words, the vibration frequency for the axial vibration and the longitudinal bending vibration is 36 kHz and that for the lateral bending vibration is 41 kHz, which means that only the lateral bending vibration is greatly shifted from others. Cutting tool 23 was mounted on the vibration body for cutting 82 of this type, and vibration on the tip of the cutting edge was measured by a laser Doppler vibrometer. As a result of the measurement, the vibration frequency for each of the longitudinal bending vibration and the axial vibration was 36.5 kHz to be substantially the same as the design, while the vibration frequency for the lateral bending vibration was 39 kHz to be slightly deviated from the designed resonance frequency. However, the resonance frequency of the longitudinal bending vibration was away from that of the lateral bending vibration, thus, aimed vibration body for cutting 82 was obtained.

For the purpose of comparison, a conventional vibration body for cutting 82 will be explained here (see FIG. 1 showing the similar form, for convenience sake). In the conventional vibration body for cutting 82, the resonance frequency of longitudinal bending vibration was substantially the same as that of lateral bending vibration, because of its cylindrical form although its diameter is made smaller at the step. Therefore, when processing work W at the portion where a facing angle is large, a cutting edge touches an object to be processed under the resonance frequency in the longitudinal bending vibration direction, thus, the force is applied in the lateral bending vibration direction, and a position of the cutting edge is greatly displaced in the lateral direction, and relatively large lateral bending vibration was caused, contrary to the longitudinal bending vibration direction which is a direction in which the vibration should be given in the case of processing. As a result, the precision of a form on the processed surface of work W was poor at the location where a facing angle was large, to be about 6 μmPV. Further, in the processing, the processed surface was rubbed by a cutting edge of cutting tool 23, and thereby, the cutting edge was extremely worn away, and the processed surface was roughened to be sandy.

For the purpose of improving the precision of the conventional apparatus explained above, an optical surface was processed by the use of the vibration body for cutting 82 of the aforesaid example, namely, of vibration cutting unit 20, wherein the vibration frequency of the longitudinal bending vibration and that of the lateral bending vibration were shifted on purpose to be away from each other. The processed form was the aforesaid cylindrical aspheric surface. As a material of work W representing an object to be processed, Micro-Alloy F (hardness HV=1850) made by Tungaloy Corporation was used. Processing chip 23a to be used for cutting, namely, a diamond tool is an R-cutting-tool wherein an angle of opening of cutting face S1 on the tip is 60° and the tip is formed to be in a circular arc form. A radius of the circular arc on the tip on cutting face S1 of a cutting edge is 0.8 mm, clearance angle γ is 5° and an angle formed by cutting face S1 at a point of cut is −35°. An amount of cut by the processing chip 23a in this case is 2 μm. After the cutting processing, surface roughness of the processed surface was measured by surface roughness measuring instrument HD 3300 made by WYKO Co. In the results of the measurement, surface roughness of the processed surface was 3.5 nmRa, and optical mirror surface capable sufficiently of being put to practical use was obtained. An error of the form of the processed surface was measured by three-dimensional form measuring instrument UA3P made by Matsushita Electric Industrial Co. Ltd., to prove its error of processed form of about 0.13 μmPV after the first processing. After conducting correction processing by preparing a processing program to correct the aforesaid form error, a result of a form error of 0.05 μmPV was obtained.

Example 5

In the present example, an arrangement was made so that an antinode of resonance in the lateral bending direction of vibration body for cutting 82 may be formed to be away greatly from fixing portion 21a on the tip of the vibration body for cutting 82, and thereby, an amplitude of lateral bending vibration on the fixing portion 21a of the vibration body for cutting 82 may become small. In the conventional method, in the case of designing vibration body for cutting 82, resonance frequencies and positions of an antinode of longitudinal bending vibration and axial vibration are obtained through simulation, and calculation has been made under the assumption that no lateral bending vibration is generated. However, in the present example, the state of vibration was calculated by giving the same vibration also in the lateral bending vibration direction. In that case, a position of a node of the lateral bending vibration does not need to agree with that of the longitudinal bending vibration or the axial vibration. Then, vibration conditions of resonance simulation for the longitudinal bending vibration and the axial vibration are inputted to simulation under the assumption that only the lateral bending vibration is generated, and a position of a node and a position of an antinode of the lateral bending vibration were confirmed. In this case, when an antinode of the vibration is located in the vicinity of fixing portion 21a of the tip of vibration body for cutting 82, a form of the vibration body for cutting 82 was changed slightly, and resonance simulation for the longitudinal bending vibration and the axial vibration was conducted again, and then the simulation of the lateral bending vibration was conducted again from the results of the resonance simulation. These simulations were repeated to determine a form of the vibration body for cutting 82.

Based on the results of the aforesaid simulations, vibration body for cutting 82 was made, and when an amplitude in the lateral bending vibration direction was measured by a laser Doppler vibrometer at the position of the cutting edge of cutting tool 23, a vibration amplitude was about 8 nm and it was possible to satisfy the fluctuation of the cutting edge position of 10 nm or less required for super-precision processing of an optical surface.

Further, turning processing was conducted by the use of vibration cutting unit 20 wherein processing device 10 shown in FIG. 12 (super-precision processing machine) is equipped with vibration body for cutting 82 of the above example.

Incidentally, in the present example, processing by horizontal rotating axis RA, X axis and Z axis was conducted without operating second movable portion 36 concerning a turning axis, because of processing a blazed structure. As a material of work W representing an object to be processed (an item to be processed), binderless tungsten alloy was used. An aimed optical surface is of a form having a blaze-shaped diffractive groove, and an amount of a blazed step is about 2 µm. Processing chip 23a used for cutting, namely, a diamond tool is a swordtip cutting tool whose top angle on the tip is as sharp as 30°. A radius of the circular arc on the tip on cutting face S1 of a cutting edge is 1.0 µm, clearance angle γ is 5° and an angle formed by cutting face S1 at a point of cut is −25°. An amount of cut by the processing chip 23a in this case is 1 µm. In the present vibration cutting, the cutting tool 23, namely, processing chip 23a vibrates in each of both the axis direction and the longitudinal bending direction, while, the cutting edge of the cutting tool 23 conducts circular motion or elliptic motion. Consequently, cutting is done in a way to scoop up with cutting face S1, and thereby, it is possible to make an amount of cut to be several times as large as that in an ordinary processing which is not vibration cutting, even in the case of ductile mode cutting. Further, in the case of forming a blazed structure as in the present example, if a portion where a facing angle is as large as 70° is processed, an angle formed by the axial vibration direction and by the optical surface with which the tool comes in contact also becomes about 70°, and an external force with frequency identical to that of vibration cutting is applied in the lateral bending vibration direction. In the case of the present example, however, a position of an antinode of lateral bending vibration of vibration body for cutting 82 can be shifted greatly from fixing portion 21a of the vibration body for cutting 82 that is the vicinity of the tip of cutting tool 23. Consequently, it was possible to conduct processing of the aimed blaze that has neither sag nor burr on an edge portion of the blaze, although in convention method, a cutting edge position was fluctuated by the lateral bending vibration, at the portion of large facing angle on the optical surface, and a shape of blaze formed on work W was extremely deformed. Further, roughness of processed surface was mirror surface under SEM observation, and targeted blaze form satisfying the design form was obtained.

Example 6

In the present example, as a means to positively reduce lateral bending vibration of vibration body for cutting 82, an error for mounting axial direction oscillator 83 or bending oscillator 84 onto vibration body for cutting 82 is made to be 5 minutes or less, when manufacturing an assembly of vibration body 120 that constitutes vibration cutting unit 20.

For mounting the axial direction oscillator 83, a mounting precision was improved by finishing up a mounting surface for the axial direction oscillator 83 representing an end surface on the root side of the vibration body for cutting 82 through grinding processing and by finishing up also a mounting surface on the axial direction oscillator 83 through grinding processing equally. Owing to this, an inclination of the vibration direction of the axial direction oscillator 83 to be connected to the vibration body for cutting 82 relative to the direction of the axial vibration designed on the vibration body for cutting 82 was made to be 2 minutes or less. Next, when mounting the bending oscillator 84 for longitudinal bending vibration on the side of the vibration body for cutting 82, marking MA1 was applied in advance on a mounting surface provided on the side of the vibration body for cutting 82, namely, on the mounting position for the bending oscillator 84. Marking MA2 was applied also on the center line that shows bilateral symmetry on the top surface of the bending oscillator 84, as shown in FIG. 19, so that the longitudinal vibration direction designed on the vibration body for cutting 82 and the vibration direction of the longitudinal bending vibration given by the bending oscillator 84 may be in parallel with each other. Bending oscillator 82 for longitudinal bending vibration was mounted on the mounting position, namely, at an antinode position of the longitudinal bending vibration so that the position of marking MA1 agrees with the position of MA2.

With respect to the assembly of vibration body 120 made in the aforesaid way, when an amplitude in the lateral bending vibration direction at the cutting edge position of cutting tool 23 was measured by a laser Doppler vibrometer, a vibration amplitude was about 10 nm and it was possible to satisfy the fluctuation of the cutting edge position of 10 nm or less required for super-precision processing of an optical surface.

Further, turning processing was conducted by the use of processing device 10 (super-precision processing machine) shown in FIG. 12 in which vibration cutting unit 20 equipped with the assembly of a vibration body 120 of the present example. Incidentally, in the present example, processing around horizontal rotating axis RA and in X axis and Z axis was conducted without operating second movable portion 36 concerning the axis of turning, for verifying the effect of the example. As a material of work W representing an object to be processed, Micro-Alloy F (hardness HV=1850) made by Tungaloy Corporation was used. The aimed optical surface was in a form of an aspheric optical surface, and it was a small and deep concave optical surface wherein approximation R concave was about 0.9 mm, a central radius of curvature was 1.33 mm and the maximum facing angle was 65°.

On work W, a surface to become an optical surface was processed to be a concave spherical surface through electro-discharge machining in advance, and it was further subjected to preliminary rough processing for changing from an approximate spherical surface form to an aspheric surface form which was conducted by a general-purpose high precision grinding machine having an axial resolving power of about 100 nm. In this rough grinding processing, an electrodeposited grindstone was used, and form corrections were repeated to attain form precision of about 1 µm in a short period of time, and an aspheric surface form was finished. Then, processing device 10 (super-precision processing machine) shown in FIG. 12 equipped with vibration body for cutting 82 of the present example was used to conduct cutting finish processing. Processing chip 23a to be used for cutting finish processing, namely, a diamond tool is an R-cutting-tool wherein an angle of opening of cutting face S1 on the tip is 30° and the tip is formed to be in a circular arc form. A radius of the circular arc on the tip on cutting face S1 of a cutting edge is 1.0 mm, clearance angle γ is 5° and an angle formed by cutting face S1 at a point of cut is −25°. An amount of cut by the processing chip 23a in this case is 2 µm. The rotation speed around a main shaft, namely, around horizontal rotating axis RA of the first moving portion 35 on which work W having a processed optical surface is fixed is 340 rpm, and a feed rate was 0.2 mm/min.

After the cutting processing, surface roughness measuring instrument HD 3300 made by WYKO Co. was used to measure surface roughness of the optical surface. As a result, surface roughness of the processed surface was 3.2 nmRa, and an optical mirror surface which can be put to practical use sufficiently was obtained. An error for the form of the processed surface was measured by three-dimensional form measuring instrument UA3P made by Matsushita Electric Industrial Co. Ltd. to prove to be about 100 nmPV after the first processing. After conducting correction processing by making a processing program to correct the form error, a result of form error of 50 nmPV was obtained. The highly accurate processed form of this kind has not been realized by only the processing at the single point where the direction of a normal line of the processed form at the processing point corresponding to the tip of processing chip 23*a* and the direction of axial vibration of assembly of a vibration body 120, namely, the direction of tool axis are made to agree with each other by the use of a turning axis. However, the present example made it possible to control position fluctuation in the lateral bending vibration direction concerning the position of a cutting edge of processing chip 23*a*, whereby, it was possible to give an preset depth of cut even at the processing point where a facing angle is large, and to create a form that follows exactly the processing program. Further, glass was molded by using a molding die for an optical element obtained from the work W. Owing to this, a glass optical element which is resistant to environment changes and can be corrected in terms of chromatic aberration.

Though the invention has been explained, referring to the embodiments, the present invention is not limited to the aforesaid embodiments. For example, in the vibration cutting unit 20, a form of the fixing portion 21*a* and a method of cramping cutting tool 23 can be modified suitably.

Further, though one set of vibration bodies 82 and 85 is supported by four holding members 82*b*, 82*c*, 85*b* and 85*c* in the aforesaid embodiment, one set of vibration bodies 82 and 85 can also be supported by two holding members 82*b* and 85*b*. Further, when two or more node portions are formed on any one of the vibration bodies 82 and 85, it is possible to provide holding members identical to the aforesaid holding members 82*b*, 82*c*, 85*b* and 85*c* on any one or more of the aforesaid node portions and thereby to fix in case member 86.

Further, in vibration cutting unit 20, when vibration cutting unit 20 is not heated much, supply of pressurized and dried air is not necessary, because dimension changes of the vibration body for cutting 82 do not need to be worried about. Further, in gas supply device 60 shown in FIG. 12, it is possible to use gaseous fluid wherein oil and other lubricant elements other than air are added as misted solvents and particles as well as inert gas such as nitrogen gas.

Further, vibration bodies 82-682 constituting assembly of vibration body 20 do not need to be single, and an oscillator exciting the vibration body may also be plural or may be plural pairs.

What is claimed is:

1. A vibration body for cutting comprising:
a fixing portion for fixing a cutting tool for vibration cutting; and
a vibration body main part for transmitting a bending vibration and an axial vibration to the cutting tool fixed to the fixing portion,
wherein, with respect to a profile of a cross sectional plane perpendicular to an axial direction of the vibration body main part in a supporting base region which is a portion between a cross sectional plane perpendicular to the axial direction of the vibration body main part at a closest node position where a node closest to the fixing portion is located, the closest node being among nodes relating to the bending vibration formed in the vibration body main part and a cross sectional plane perpendicular to the axial direction of the vibration body main part at a cutting tool rear end position where an end of the fixed cutting tool, which is closest to the closest node position is located, a length of the profile in a direction perpendicular to a prescribed bending vibration direction of the vibration body main part is longer than a length of the profile in the prescribed bending vibration direction.

2. The vibration body for cutting of claim 1,
wherein the length in the direction perpendicular to the prescribed bending vibration direction is longer than the length in the prescribed bending vibration direction by a factor of 1.1 to 10 times.

3. The vibration body for cutting of claim 1,
wherein, in the supporting base region, at least one of the length in the direction perpendicular to the prescribed bending vibration direction and the length in the prescribed bending vibration direction decreases from the closest node position toward the fixing portion.

4. The vibration body for cutting of claim 1,
wherein, in the supporting base region, a profile of any cross sectional plane perpendicular to the axial direction is oval.

5. The vibration body for cutting of claim 1,
wherein, in the supporting base region, a profile of any cross sectional plane perpendicular to the axial direction has at least one straight-line portion.

6. A vibration body for cutting comprising:
a fixing portion for fixing a cutting tool for vibration cutting; and
a vibration body main part for transmitting a bending vibration and an axial vibration to the cutting tool fixed to the fixing portion,
wherein a resonance frequency of a longitudinal bending vibration in a prescribed bending vibration direction of the vibration body main part differs from a resonance frequency of a lateral bending vibration perpendicular to the prescribed bending vibration direction.

7. A vibration body for cutting comprising:
a fixing portion for fixing a cutting tool for vibration cutting; and
a vibration body main part for transmitting a bending vibration and an axial vibration to the cutting tool fixed to the fixing portion,
wherein an antinode of a longitudinal bending vibration in a prescribed bending vibration direction of the vibration body main part is formed in the fixing portion or a vicinity of the fixing portion and an antinode of a lateral bending vibration perpendicular to the prescribed bending vibration direction is formed in a portion except in the fixing portion and the vicinity of the fixing portion.

8. The vibration body for cutting of claim 1 further comprising:
a holding member integrally formed on a node portion corresponding to at least one of node positions of vibration relating to a bending vibration and an axial vibration when the vibration body main part vibrates.

9. The vibration body for cutting of claim 8,
wherein, the holding member extends from the node portion in a direction perpendicular to the prescribed bending vibration direction of the vibration body main part.

10. The vibration body for cutting of claim 1 further comprising:
a vibration source for vibrating the cutting tool through the vibration body main part by providing a vibration to the vibration body main part.

11. The vibration body for cutting of claim 10,
wherein the vibration source includes an axial vibration source for providing an axial vibration to the vibration body main part and the axial vibration source is set so that an angle difference between a vibration direction of the axial vibration source and the axial direction of the vibration body main part is within 5 minutes.

12. The vibration body for cutting of claim 10, wherein the vibration source includes a bending vibration source for providing a bending vibration to the vibration body main part and the bending vibration source is set so that an angle difference between a vibration direction of the bending vibration source and the prescribed bending direction of the vibration body main part is within 5 minutes.

13. A processing device comprising:
the vibration body for cutting of claim 1; and
a driving device for moving the vibration body for cutting while operating the vibration body for cutting.

14. A molding die which is produced by using the vibration body for cutting of claim 1 and which has a transfer optical surface for forming an optical surface of an optical element.

15. An optical element produced by using the vibration body for cutting of claim 1.

* * * * *